United States Patent
Seo et al.

(10) Patent No.: US 8,768,117 B2
(45) Date of Patent: Jul. 1, 2014

(54) OPTICAL FIBER COUPLER, METHOD OF MANUFACTURING THE OPTICAL FIBER COUPLER, AND ACTIVE OPTICAL MODULE

(75) Inventors: Hong-Seok Seo, Daejeon (KR); Joon Tae Ahn, Daejeon (KR); Bong Je Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 635 days.

(21) Appl. No.: 13/019,301

(22) Filed: Feb. 1, 2011

(65) Prior Publication Data

US 2012/0051692 A1    Mar. 1, 2012

(30) Foreign Application Priority Data

Aug. 26, 2010    (KR) .................. 10-2010-0083057

(51) Int. Cl.
*G02B 6/26*    (2006.01)
*G02B 6/02*    (2006.01)

(52) U.S. Cl.
USPC ................. 385/28; 385/31; 385/43; 385/126; 385/127

(58) Field of Classification Search
USPC .................. 385/28, 31, 39, 43, 123–128
See application file for complete search history.

(56) References Cited

U.S. PATENT DOCUMENTS

| | | | |
|---|---|---|---|
| 5,864,644 A | 1/1999 | DiGiovanni et al. | |
| 5,999,673 A | 12/1999 | Valentin et al. | |
| 6,328,482 B1 | 12/2001 | Jian | |
| 7,209,615 B2 | 4/2007 | Fishteyn | |
| 2009/0148098 A1* | 6/2009 | Lewis et al. | 385/31 |

FOREIGN PATENT DOCUMENTS

| | | |
|---|---|---|
| JP | 2008-276233 A | 11/2008 |
| KR | 10-2007-0031179 | 3/2007 |

* cited by examiner

*Primary Examiner* — Uyen Chau N Le
*Assistant Examiner* — Michael Mooney
(74) *Attorney, Agent, or Firm* — Rabin & Berdo, P.C.

(57) ABSTRACT

There are provided an optical fiber coupler configured to improve or optimize optical efficiency and coupling efficiency, a method of manufacturing the optical fiber coupler, and an active optical module. The optical fiber coupler includes a first optical fiber and second optical fibers. The first optical fiber includes a first core and a first cladding surrounding the first core, and the second optical fibers are coupled to the first cladding. The first cladding includes a first coupling facet to which ends of the second optical fibers are coupled.

11 Claims, 19 Drawing Sheets

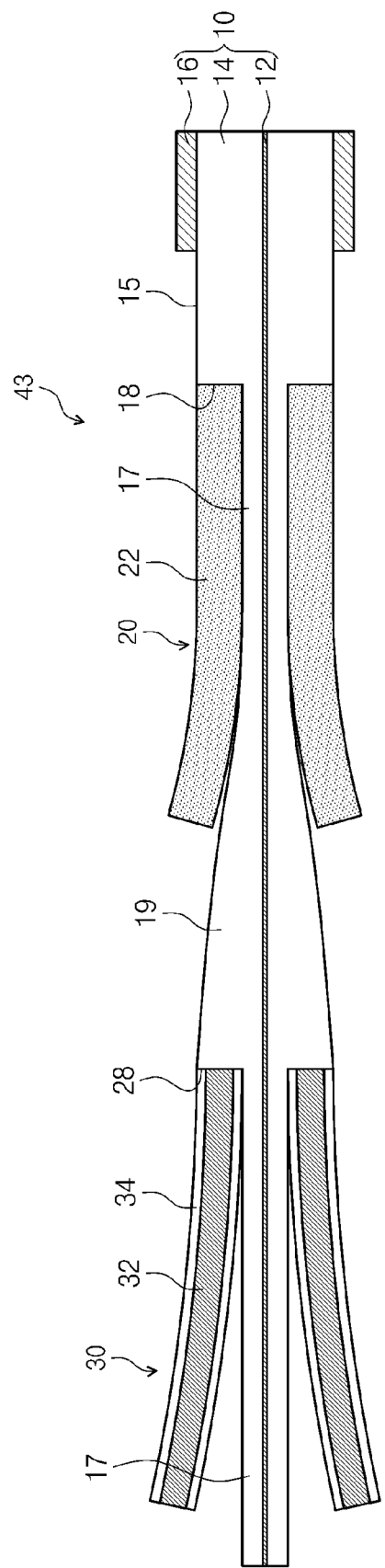

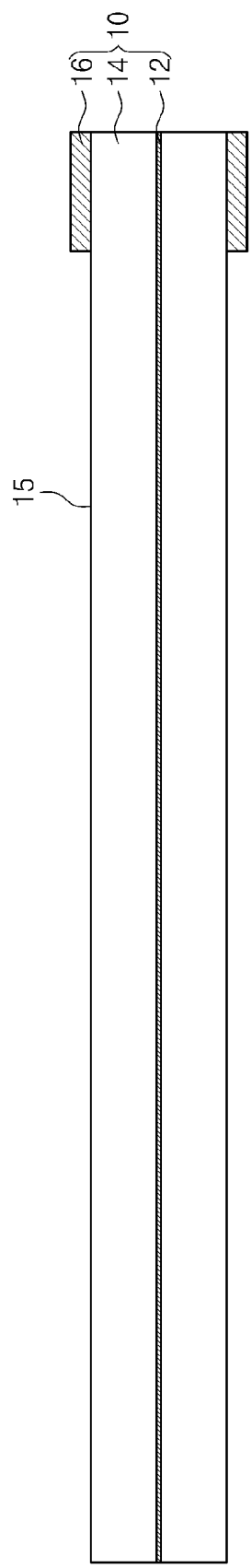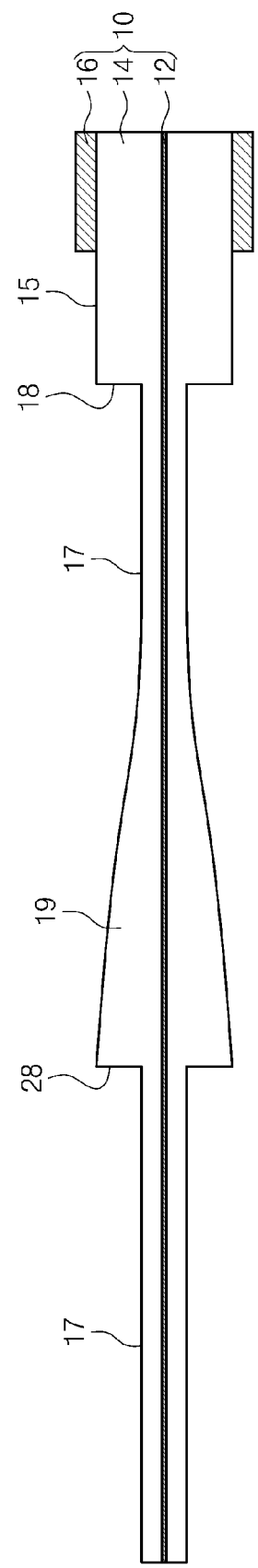

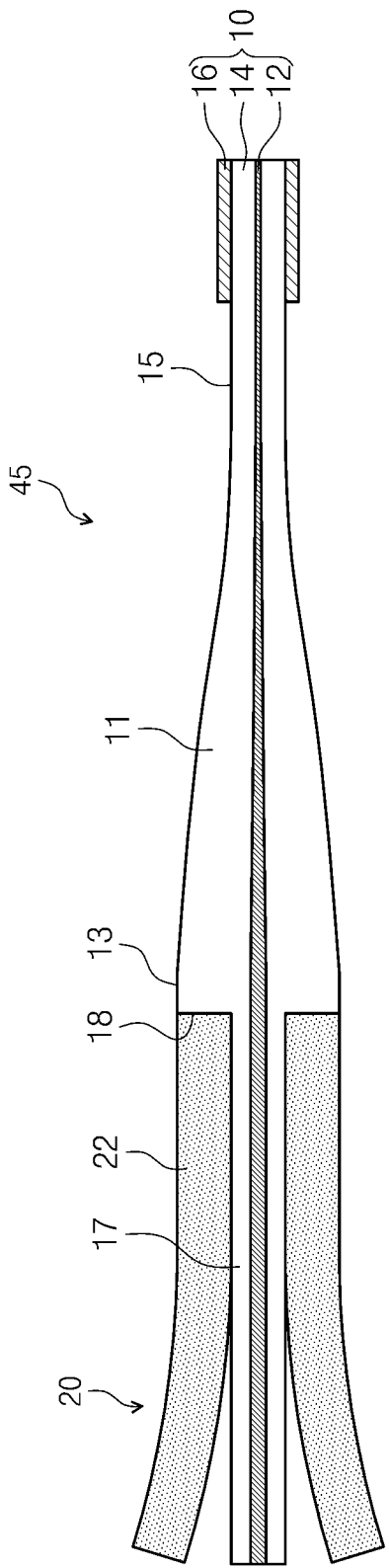

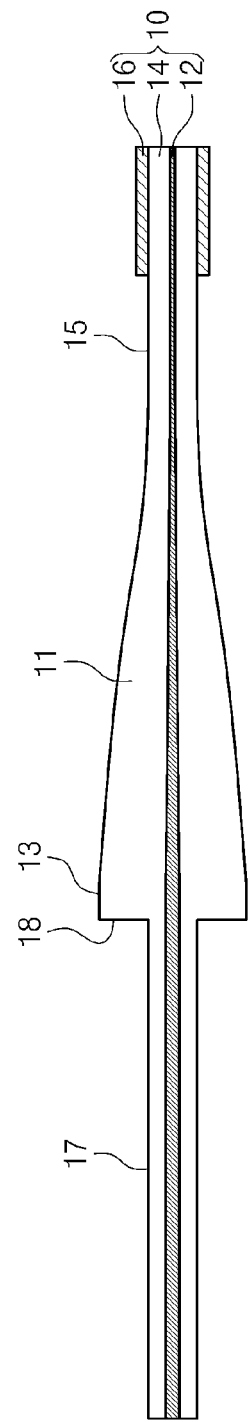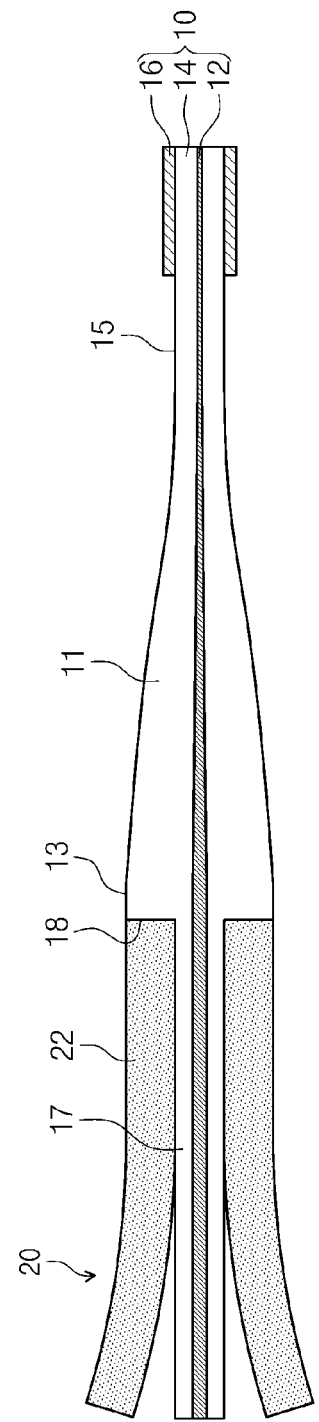

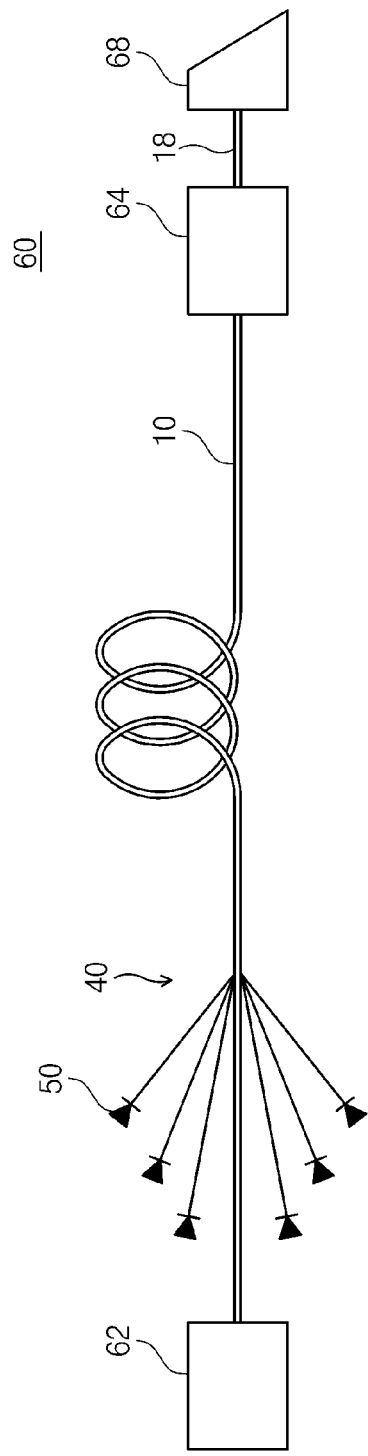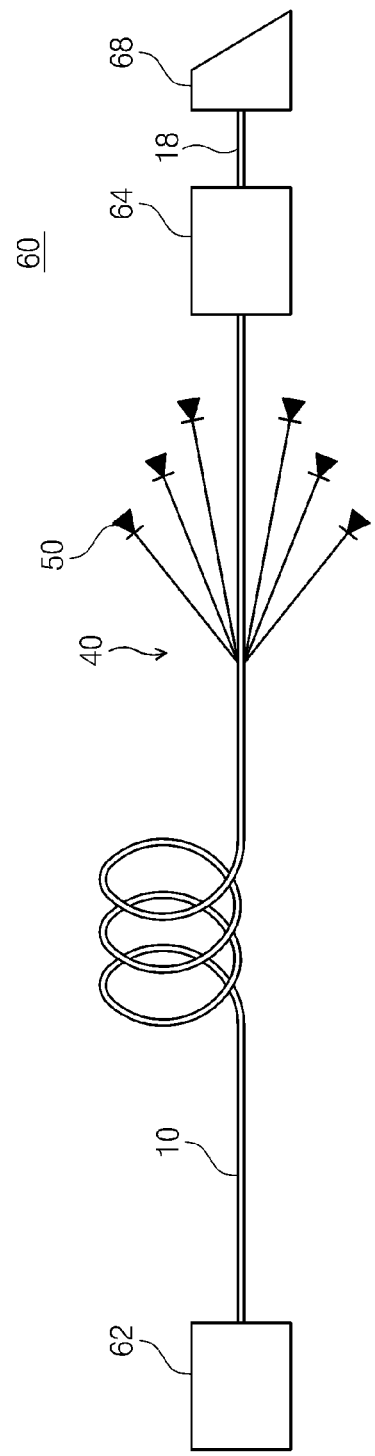
Fig. 11A
Fig. 11B

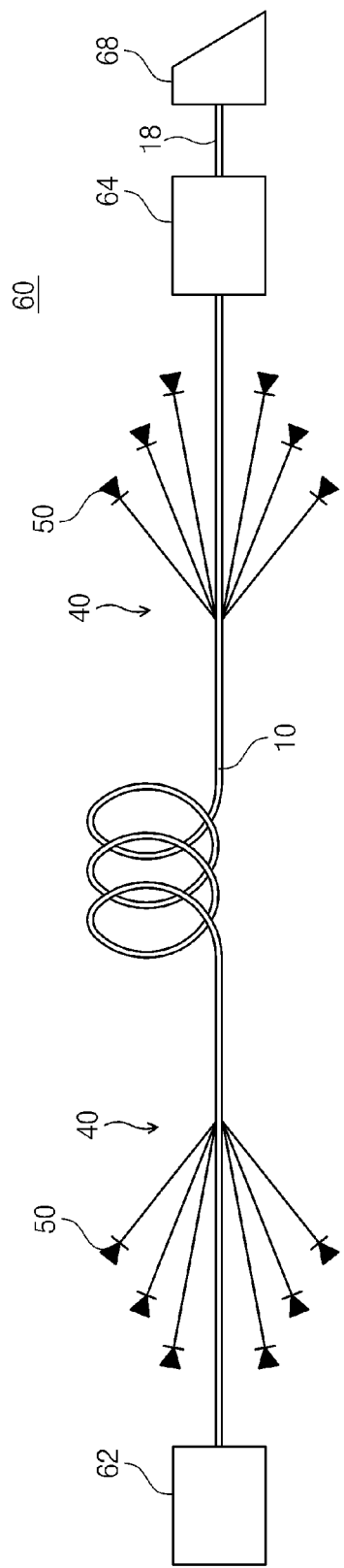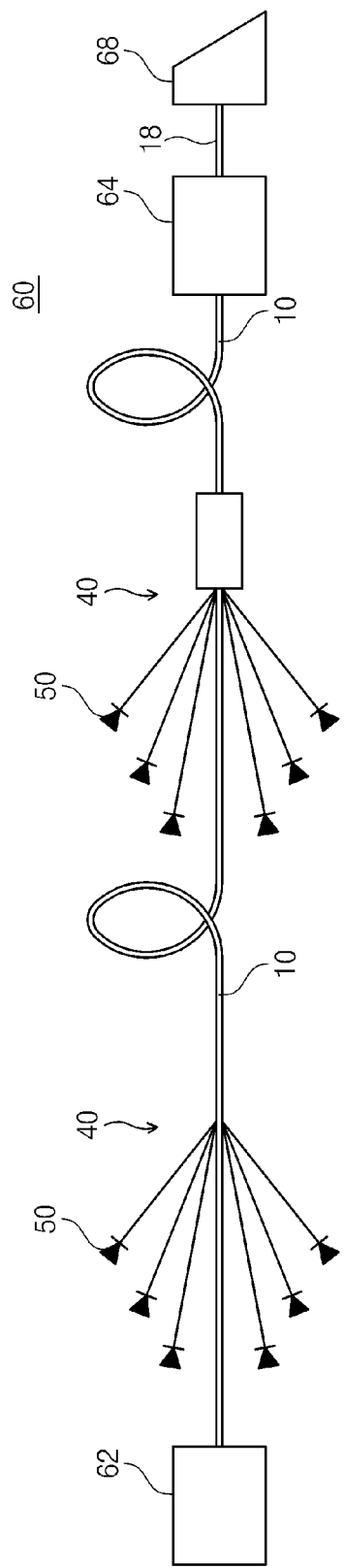

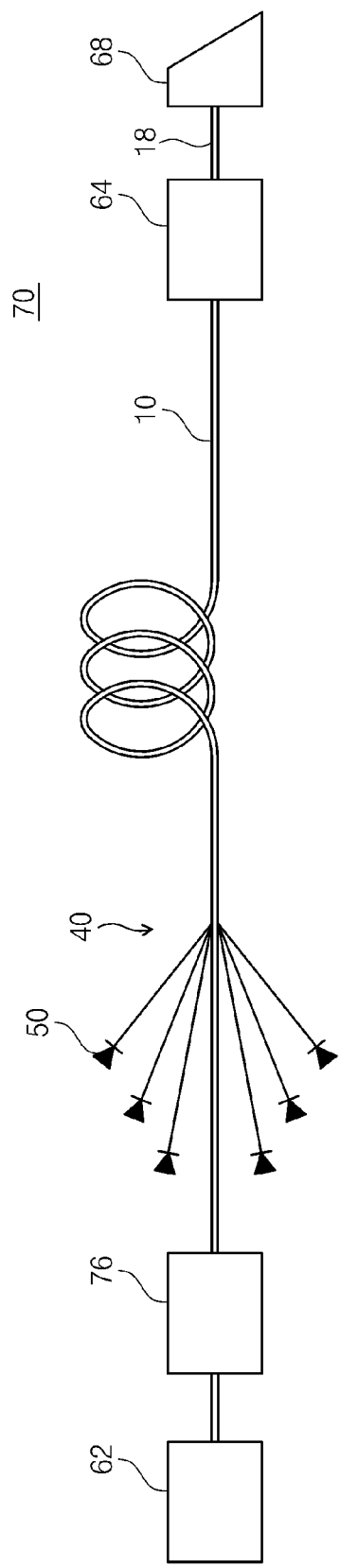
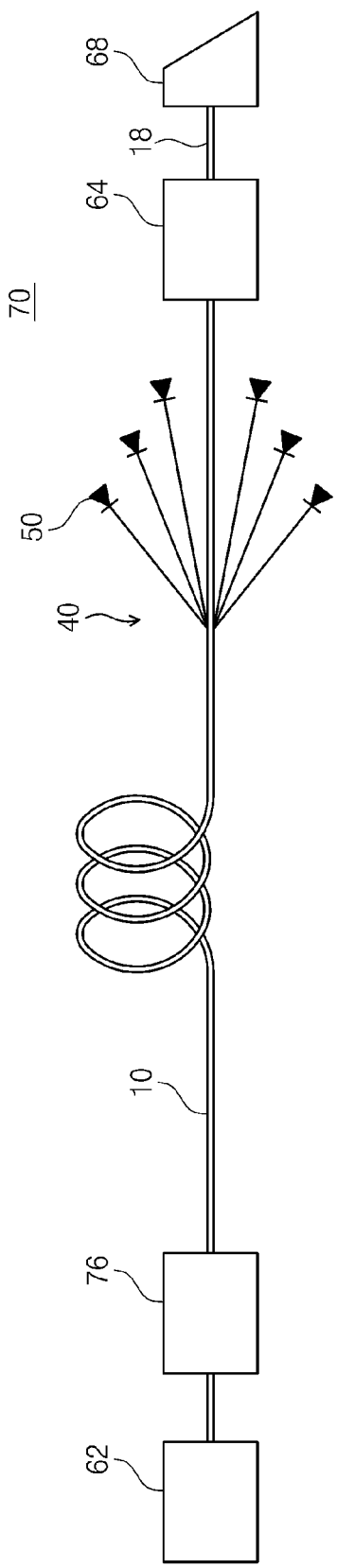
Fig. 12A
Fig. 12B

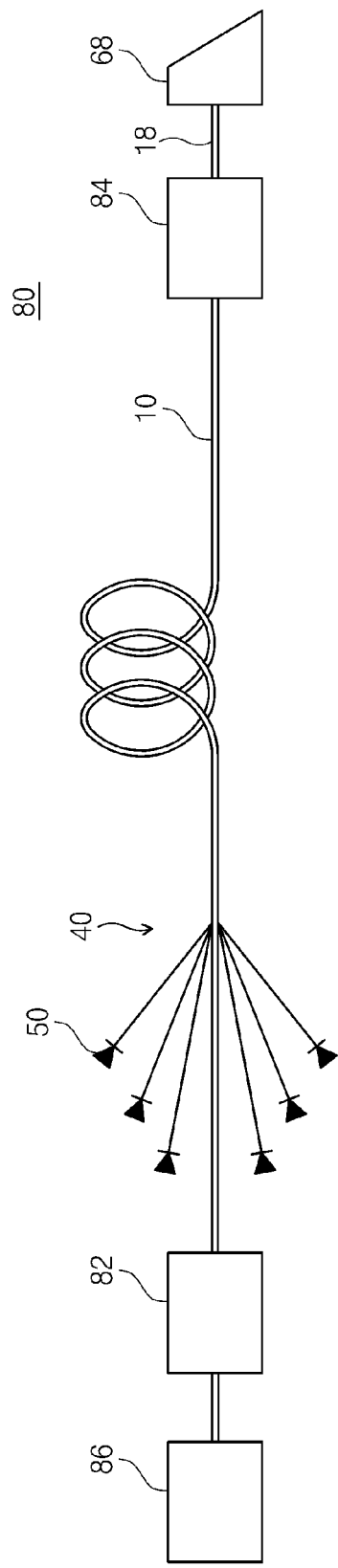
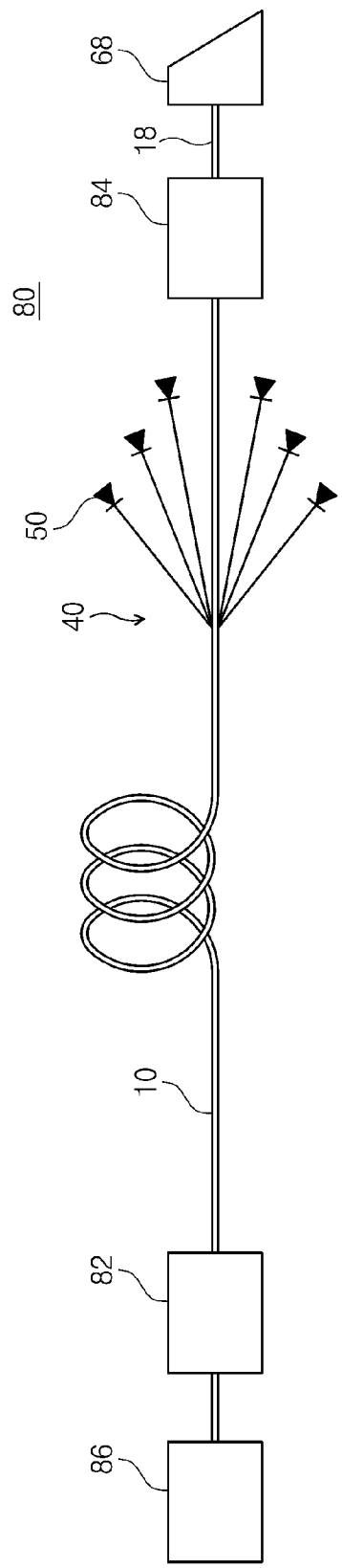

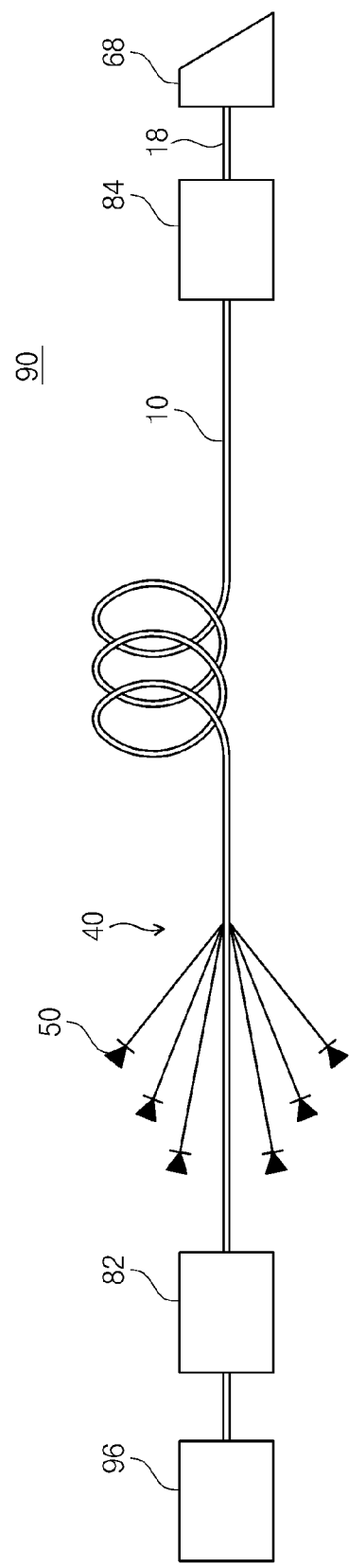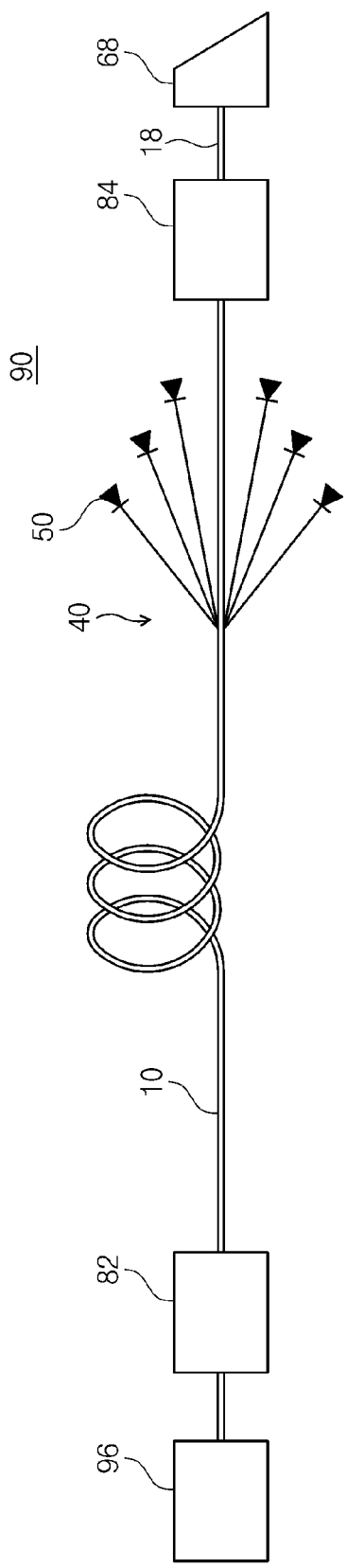

OPTICAL FIBER COUPLER, METHOD OF MANUFACTURING THE OPTICAL FIBER COUPLER, AND ACTIVE OPTICAL MODULE

CROSS-REFERENCE TO RELATED APPLICATIONS

This U.S. non-provisional patent application claims priority under 35 U.S.C. §119 of Korean Patent Application No. 10-2010-0083057, filed on Aug. 26, 2010, the entire contents of which are hereby incorporated by reference.

BACKGROUND OF THE INVENTION

The inventive concept disclosed herein relates to an active optical module, and more particularly, to an optical fiber coupler, a method of manufacturing the optical fiber coupler, and an active optical module using the same.

Laser light can be generated using various kinds of lasers. Examples of lasers include semiconductor lasers, crystal lasers, and optical fiber lasers. Optical fiber lasers may include an optical fiber having a double cladding structure. An optical fiber laser may generate laser light by pump light supplied to a core having a lasing material. High-power laser light may be emitted from optical fiber by efficiently supplying pump light to a core of an optical fiber through an optical fiber coupler.

SUMMARY OF THE INVENTION

The inventive concept provides an optical fiber coupler configured to increase coupling efficiency of laser diodes supplying pump light, a method of manufacturing the optical fiber coupler, and an active optical module using the same.

Embodiments of the inventive concept provide optical fiber couplers including a double cladding optical fiber having a coupling facet formed by etching a first cladding, and multi-mode optical fibers coupled to the coupling facet. The optical fiber coupler may include: a first optical fiber including a first core and a first cladding surrounding the first core; and second optical fibers coupled to the first cladding. The first cladding may include a first coupling facet to which ends of the second optical fibers are coupled.

In some embodiments, the first optical fiber may further include a second cladding surrounding the first cladding. The first optical fiber may include a double cladding optical fiber. At the coupling facet, the first cladding may have a refractive index equal to that of the second optical fibers and a numerical aperture equal to or greater than that of the second optical fibers. Therefore, the coupling efficiency of the first cladding and the second optical fibers may be increased. The first core of the first optical fiber may include a rare earth element. Pump light supplied to the first core through the first cladding from the second optical fibers may excite the rare earth element to generate laser light.

In other embodiments, the first cladding may include: a first part having a first outer diameter equal to an inner diameter of the second cladding; and a second part having a second outer diameter smaller than the first outer diameter, wherein the first coupling facet may be defined by a side wall between the first part and the second part. The first coupling facet of the first cladding may have a width equal to the second outer diameter.

In still other embodiments, the second optical fibers may have a diameter equal to the second outer diameter of the first cladding. In addition, the diameter of the second optical fibers may be equal to the width of the first coupling facet.

In even other embodiments, the second optical fibers may surround the second part of the first cladding having the second outer diameter in one layer or double layers. For example, six second optical fibers may surround the second part of the first cladding having the second outer diameter in one layer, or eighteen second optical fibers may surround the second part of the first cladding having the second outer diameter in two layers.

In yet other embodiments, the first coupling facet may have a direction vertical to the first core. The second optical fibers may be coupled to the first coupling facet. The second optical fibers may have the same refractive index and numerical aperture as those of the first coupling facet of the first cladding 14, or a numerical aperture smaller than that of the first coupling facet.

In further embodiments, the first coupling facet may have a width equal to or greater than a diameter of the second optical fibers. The width of the first coupling facet may be equal to the second outer diameter of the second part. When the width of the first coupling facet is greater than the diameter of the second optical fibers, the first coupling facet may cover the second optical fibers.

In still further embodiments, a numerical aperture of the first cladding at the first coupling facet may be equal to a numerical aperture of the second optical fibers. Alternatively, the numerical aperture of the second optical fibers may be smaller than the numerical aperture of the first cladding. In this case, transmission efficiency of pump light may be increased.

In even further embodiments, the first cladding may further include: a tapered region extending from the second part and having a gradually increasing outer diameter; and a second coupling facet disposed on a side of the tapered region opposite to the first coupling facet. The numerical aperture of the first coupling facet of the first cladding may be different from the numerical aperture of the second coupling facet of the first cladding. In the tapered region, since a beam parameter product (BPP) is constant, the numerical aperture of the first cladding may be decreased according to a thickness increased from the second outer diameter to the first outer diameter.

In yet further embodiments, the optical fiber coupler may further include third optical fibers coupled to the second coupling facet. The diameter of the third optical fibers may be equal to the second outer diameter of the first cladding. The numerical aperture of the third optical fibers may be about ⅓ the numerical aperture of the second optical fibers.

In some embodiments, the third optical fibers may include a hard clad silica fiber or a double cladding fiber. The diameter and numerical aperture of the third optical fibers may be about 125 µm and about 0.15, respectively.

In other embodiments, the first cladding may further include an up-tapered region increasing in size from the first outer diameter to a third outer diameter greater than the first outer diameter. If the third outer diameter of the first cladding is about three times the first outer diameter of the first cladding, the numerical aperture of the first cladding may be decreased to about ⅓ in the up-tapered region.

In still other embodiments, the second optical fibers may have a diameter equal to the first outer diameter of the first cladding. The numerical aperture of the second optical fibers may be about ⅓ the numerical aperture of the first cladding.

In even other embodiments, the second optical fibers may include a multi-mode optical fiber. The second optical fibers may include a multi-mode core. The second optical fibers may include a third cladding surrounding the multi-mode core.

In yet other embodiments, the multi-mode optical fiber may include a tapered core having a gradually decreasing outer diameter.

In other embodiments of the inventive concept, there are provided methods of manufacturing an optical fiber coupler, the methods including: preparing a first optical fiber including a first cladding and a first core in the first cladding, the first cladding including a first part having a first outer diameter; etching the first cladding partially to form a second part having a second outer diameter smaller than the first outer diameter of the first part so as to form a first coupling facet between the first part and the second part; and coupling ends of second optical fibers to the first coupling facet.

In some embodiments, the etching of the first cladding may include: forming a tapered region having an outer diameter increased from the second outer diameter gradually; and forming a second coupling facet at a side of the tapered region opposite to the first coupling facet. The first coupling facet and the second first coupling facet may have the same size. The numerical aperture of the first cladding at the first coupling facet may be different from the numerical aperture of the first cladding at the second coupling facet.

In other embodiments, the method may further include coupling third optical fibers to the second coupling facet, the third optical fibers having a numerical aperture smaller than a numerical aperture of the second optical fibers. The third optical fibers may have the same diameter as that of the second optical fibers. The numerical aperture of the third optical fibers may be about ⅓ the numerical aperture of the second optical fibers.

In still other embodiments, prior to the etching of the first cladding, the method may further include forming an up-tapered region having an outer diameter increased from the first outer diameter by fusing and shrinking the first cladding. The numerical aperture of the first cladding may decrease in the up-tapered region.

In still other embodiments of the inventive concept, active optical modules includes: a pump light source generating pump light; an optical fiber coupler including a first optical fiber and second optical fibers, the first optical fiber including a first core and a first cladding surrounding the first core, the second optical fibers coupled to the first cladding of the first optical fiber to transmit the pump light generated from the pump light source to the first optical fiber; a first optical device disposed at an end of the first optical fiber to which the second optical fibers may be coupled; and a second optical device disposed at the other end of the first optical fiber opposite to the first optical device to output laser light generated in the first optical fiber, wherein the first cladding of the optical fiber coupler includes a first coupling facet to which ends of the second optical fibers may be coupled.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIG. 5 is a sectional view illustrating an optical fiber coupler according to a third embodiment of the inventive concept;

FIGS. 6A through 6C are sequential sectional views for explaining a method of manufacturing the optical fiber coupler of the third embodiment of the inventive concept;

FIG. 8 is a sectional view illustrating an optical fiber coupler according to a fifth embodiment of the inventive concept;

FIGS. 9A through 9D are sequential sectional views for explaining a method of manufacturing the optical fiber coupler of the fifth embodiment of the inventive concept;

FIGS. 11A through 11D are schematic views illustrating an active optical module including the optical fiber coupler of the first embodiment of the inventive concept;

FIGS. 12A through 12D are schematic views illustrating an active optical module including the optical fiber coupler of the second embodiment of the inventive concept;

FIGS. 13A through 13D are sectional views illustrating an active optical module including the optical fiber coupler of the third embodiment of the inventive concept; and FIGS. 14A through 14D are sectional views illustrating an active optical module including the optical fiber coupler of the fourth embodiment of the inventive concept.

DETAILED DESCRIPTION OF PREFERRED EMBODIMENTS

Figure 1:
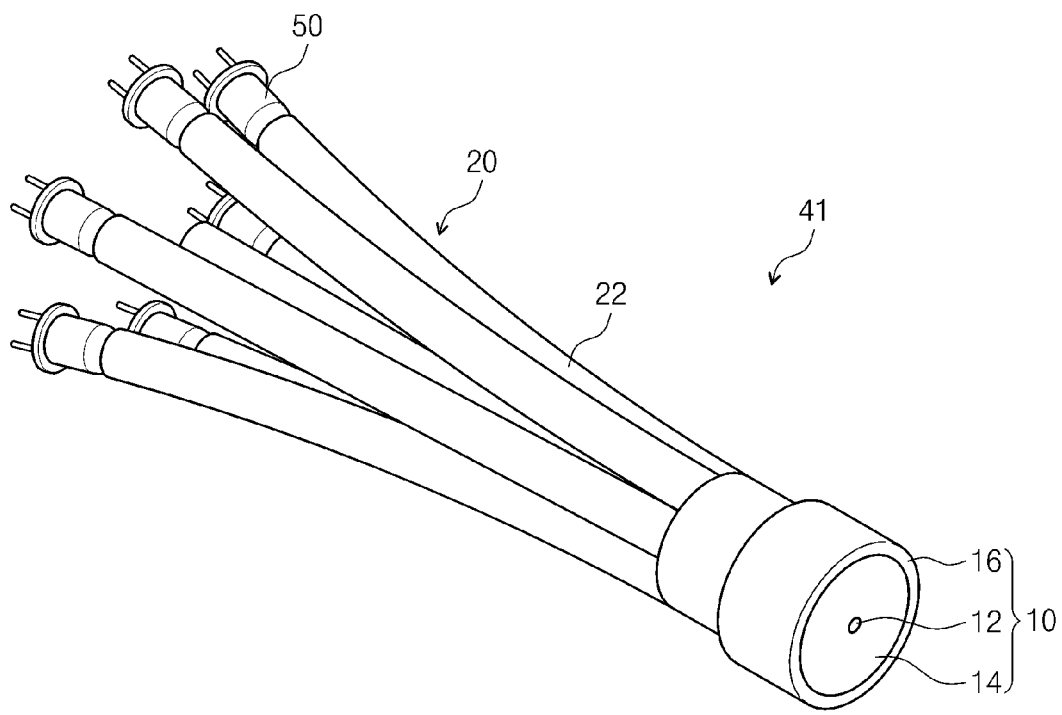
FIG. 1 is a perspective view illustrating an optical fiber coupler according to a first embodiment of the inventive concept.

Preferred embodiments of the inventive concept will be described below in more detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. Further, the inventive concept is only defined by scopes of claims. In the drawings, like reference numerals refer to like elements.

In the following description, technical terms are used only for explaining a specific exemplary embodiment while not limiting the inventive concept. The terms of a singular form may include plural forms unless referred to the contrary. The meaning of "include," "comprise," "including," or "comprising," specifies a property, a region, a fixed number, a step, a process, an element and/or a component but does not exclude other properties, regions, fixed numbers, steps, processes, elements and/or components. Since preferred embodiments are provided below, the order of the reference numerals given in the description is not limited thereto.

Figure 2:
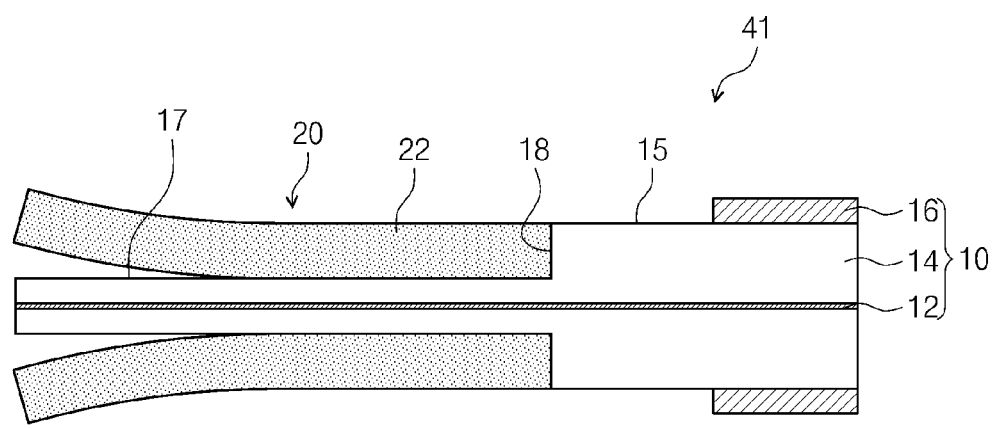
FIG. 2 is a sectional view illustrating the optical fiber coupler illustrated in FIG. 1.

FIG. 1 is a perspective view illustrating an optical fiber coupler 41 according to a first embodiment of the inventive concept, and FIG. 2 is a sectional view illustrating the optical fiber coupler 41 illustrated in FIG. 1.

Referring to FIGS. 1 and 2, the optical fiber coupler 41 of the first embodiment of the inventive concept may include a first optical fiber 10 to which second optical fibers 20 are coupled. The second optical fibers 20 may be coupled to a coupling facet 18 having a predetermined width. The coupling facet 18 of the optical fiber 10 formed by etching a first cladding 14 surrounding a first core 12. The first cladding 14 may include a first part 15 having a first outer diameter equal to the inner diameter of a second cladding 16, and a second part 17 having a second outer diameter smaller than the first outer diameter. The coupling facet 18 may be disposed between the first part 15 and the second part 17. The coupling facet 18 may be vertical or oblique to the first core 12 of the first optical fiber 10. The second optical fibers 20 may extend along the outer surface of the second part 17 of the first cladding 14 in parallel with the first core 12, and ends of the second optical fibers 20 may be coupled to the coupling facet 18.

Accordingly, the optical fiber coupler 41 of the first embodiment of the inventive concept may increase coupling efficiency of the first optical fiber 10 and the second optical fibers 20. The first cladding 14 may have the same refractive index as that of second cores 22 of the second optical fibers 20. Thus, pump light may propagate from the second optical fibers 20 to the first cladding 14 of the first optical fiber 10 more efficiently.

The first optical fiber 10 may include a double cladding optical fiber or a photonic crystal fiber constituted by the first core 12 and the first and second claddings 14 and 16 surrounding the first core 12. The first core 12 of the double cladding optical fiber may include silica glass to which a rare earth element is added. The first core 12 may include a single-mode core or a multi-mode core. The first cladding 14 may include the coupling facet 18 to which the second optical fibers 20 are coupled, and in the first cladding 14, the first core 12 may have a constant diameter with no discontinuous section. The first core 12 may have a refractive index greater than that of the second cores 22 of the second optical fibers 20. In the case of the double cladding optical fiber, the first and second claddings 14 and 16 may have refractive indices less than that of the first core 12. The refractive index of the first cladding 14 may be greater than that of the second cladding 16. The first cladding 14 may include silica glass. The first core 12 and the first cladding 14 may be different in refractive index by about 0.001 to about 0.005. The second cladding 16 may include a fluorine polymer.

Similarly, the first core 12 of the photonic crystal fiber may include silica glass to which a rare earth element is added. The first cladding 14 of the photonic crystal fiber may include silica glass in which a number of fine capillaries are regularly arranged in a length direction. The second cladding 16 of the photonic crystal fiber may include silica glass having the same refractive index as that of the first core 12, and capillary holes of the second cladding 16 greater than those of the first cladding 14 may be arranged in a length direction.

The second optical fibers 20 may include multi-mode optical fibers having the second core 22. The second optical fibers 20 may extend as one layer along the outer surface of the second part 17 of the first cladding 14 in parallel with the first core 12. The second cores 22 of the second optical fibers 20 may have a diameter equal to or smaller than the width of the coupling facet 18 of the first cladding 14. The second cores 22 may be formed of the same material as that used to form the first cladding 14. The second optical fibers 20 may include third claddings (not shown) surrounding the second cores 22. Alternatively, the second optical fibers 20 may include silica optical fibers having no claddings.

The second optical fibers 20 may transmit pump light supplied from pump light sources 50 to the first optical fiber 10. The pump light sources 50 may generate pump light. The pump light sources 50 may include laser diodes (LDs) capable of emitting pump light by using power supplied from an external power source. The LDs may have a single emitter structure, a bar structure, or a stack structure. The pump light sources 50 may emit pump light in a wavelength band including at least one of 808 nm, 915 nm, 950 nm, 980 nm, 1480 nm, and other wavelengths.

Pump light may be transmitted to the first optical fiber 10 through the second cores 22 of the second optical fibers 20. All the pump light may be incident on the first cladding 14 of the first optical fiber 10 from the second cores 22 without any reflection. This is possible because the first cladding 14 and the second optical fibers 20 have the same refractive index. The pump light transmitted from the second optical fibers 20 to the first cladding 14 may be absorbed into the first core 12.

Accordingly, the optical fiber coupler 41 of the first embodiment of the inventive concept may be prevented in reflection of pump light at the coupling facet 18 because the first cladding 14 and the second cores 22 have the same refractive index.

The first core 12 may include an active material capable of amplified spontaneous emission (ASE) by absorbing pump light incident from the second optical fibers 20. The active material may include a rare earth element. When the rare earth element absorbs pump light supplied from the second optical fibers 20, electrons may be exited to a metastable state, and laser light may be emitted while the excited electrons are becoming stable. The rare earth element may include at least one of erbium (Er), ytterbium (Yb), and thulium (Tm). Erbium (Er), ytterbium (Yb), and thulium (Tm) may emit laser light having wavelength bands of 1550 nm, 1080 nm, and 2000 nm, respectively.

The first core 12 may absorb pump light propagating in a direction where the second optical fibers 20 are coupled to the first cladding 14. The propagating direction of pump light may be equal to the direction which the second optical fibers 20 are connected to the first optical fiber 10.

Loss of pump light propagating from the second optical fibers 20 to the first optical fiber 10 may be minimized by adjusting a beam parameter product (BPP) value. The BPP value may correspond to the product of the core diameter of an optical fiber through which light propagates and the numerical aperture of the optical fiber. The numerical aperture is a value for determining an incident angle of light which affects propagation of the light. The numerical aperture may correspond to the sine of a maximum angle at which light is totally reflected and propagate in an optical fiber without refraction to the outside. Thus, if the outer diameter and numerical aperture of an optical fiber is known, the BPP value may be determined. If the numerical apertures of the second cores 22 and the first cladding 14 are equal at the coupling facet 18, loss of pump light can be minimized.

For example, the outer diameter of the first cladding 14 having a numerical aperture of about 0.46 may be about 375 μm at the first part 15 and about 125 μm at the second part 17. Each of the second cores 22 of the second optical fibers 20 connected to the coupling facet 18 of the first cladding 14 may be 125 μm in diameter and 0.46 in numerical aperture. Therefore, the diameter of the second cores 22 may be equal to the second outer diameter of the second part 17 of the first cladding 14. The number of the second cores 22 that can be connected to the coupling facet 18 of the first cladding 14 may be six. If the maximum power of pump light that can be transmitted to the first cladding 14 through an entire section (not shown) of the first cladding 14 is assumed to be 1, about $6/7$ of the maximum power of the pump light may be transmitted to the first cladding 14 through the second cores 22 of the second optical fibers 20, and about 1/7 value may make a structural loss because the pump light cannot be supplied into the second part 17 of the first cladding 14 through the optical fiber coupler 41.

The first cladding 14 may have the same refractive index and numerical aperture as those of the second cores 22 of the second optical fibers 20 connected to the coupling facet 18 of the first cladding 14. Therefore, the optical fiber coupler 41 of the first embodiment of the inventive concept can have improved or optimized coupling efficiency.

An explanation will now be given on a method of manufacturing the optical fiber coupler 41 of the first embodiment of the inventive concept.

Figure 3A:
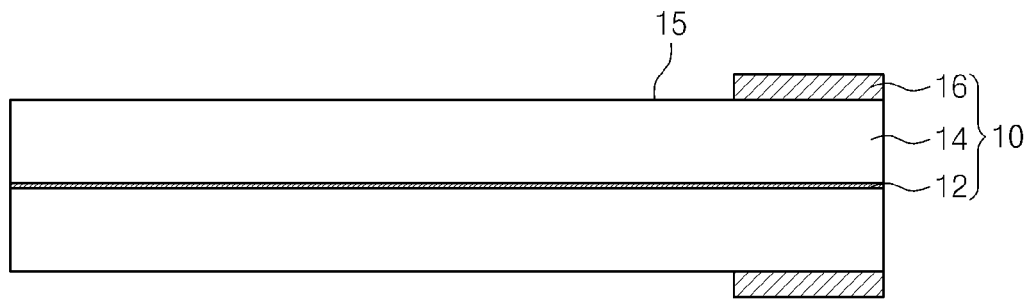
FIGS. 3A through 3C are sectional views for explaining a method of manufacturing the optical fiber coupler of the first embodiment of the inventive concept.
Figure 3B:
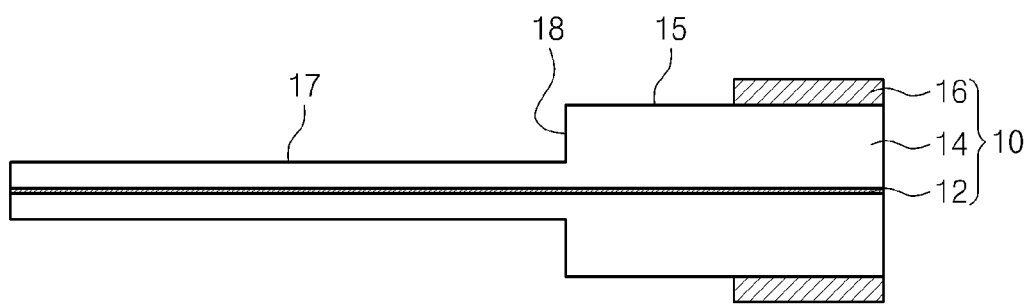
Figure 3C:
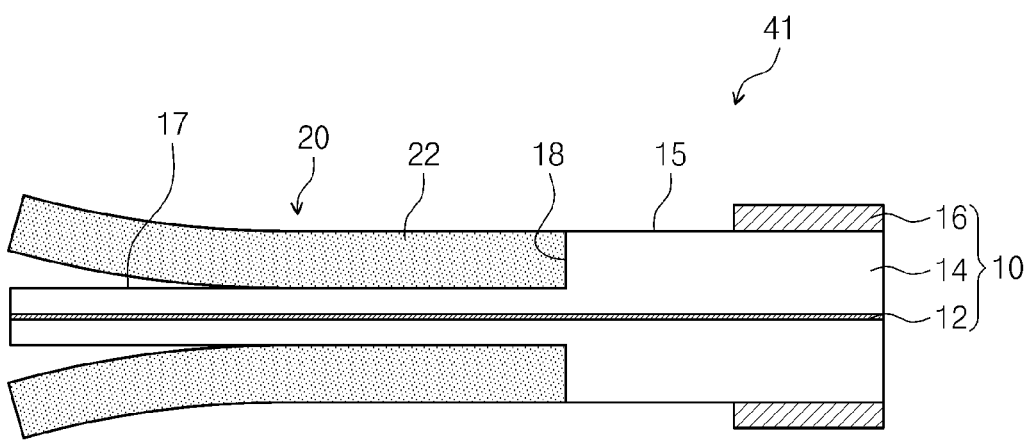

FIGS. 3A through 3C are sectional views for explaining a method of manufacturing an optical fiber coupler 41 of the first embodiment of the inventive concept.

Referring to FIG. 3A, a second cladding 16 of a first optical fiber 10 may be partially removed to expose a first cladding 14. The second cladding 16 may be partially removed by an etching method. For example, the second cladding 16 may be partially removed by a mechanical stripper or chemical etch. In another example, the second cladding 16 may be partially removed by a mechanical etching method. A first part 15 of the first cladding 14 which is partially removed by etching the second cladding 16 may have a first outer diameter of about 375 μm.

Referring to FIG. 3B, a part of the first cladding 14 may be removed to form a coupling facet 18 having a predetermined width. The coupling facet 18 may be formed by partially removing the first cladding 14 through a wet etching method or a dry etching method. The coupling facet 18 may be vertical or oblique to a first core 12 of the first optical fiber 10. In case of using a wet etching method, the first cladding 14 may be etched by using a hydrofluoric acid or a buffer etching solution including a hydrofluoric acid. The wet etching method may include a dipping method in which the first cladding 14 is dipped in the buffer etching solution. The dry etching method may include a $CO_2$ or femto second (fs) laser etching method. The first cladding 14 may be etched by a $CO_2$ or fs laser through the process of ablation. The first cladding 14 may be etched by the $CO_2$ or fs laser while being rotated. For example, the first cladding 14 having a first outer diameter of about 375 μm may be etched to have a second outer diameter of about 125 μm by a wet or dry etching method. For example, a second part 17 having the second outer diameter may be formed by a wet etching method, and the coupling facet 18 may be formed by a dry etching method. The first cladding 14 may include the coupling facet 18 at a stepped part between the first part 15 having the first outer diameter and the second part 17 having the second outer diameter. Thus, the width of the coupling facet 18 may be about 125 μm.

Referring to FIG. 3C second cores 22 of second optical fibers 20 may be coupled to the coupling facet 18. The second cores 22 of the second optical fibers 20 may be coupled to the coupling facet 18 after third claddings are removed from the second optical fibers 20. At least one of the second cores 22 of the second optical fibers 20 may be closely packed in a bundle around the first cladding 14. The second optical fibers 20 may be closely packed in a bundle around the first cladding 14 by using a clamp (not shown). The second cores 22 may surround the second part 17 of the first cladding 14 having the second outer diameter and extend in a direction parallel with the first core 12. The second optical fibers 20 may be fused to the coupling facet 18 by using a micro torch, an electric heater, or a $CO_2$ laser. In case of using a micro torch, the second cores 22 of the second optical fibers 20 may be fused to the coupling facet 18 by a gas flame of the micro torch. In case of using an electric heater, the second optical fibers 20 may be fused as being heated to a high temperature by the electric heater. In case of using a $CO_2$ laser, the second optical fibers 20 may be fused more precisely than the case of using a micro torch. The second optical fibers 20 may be coupled to the coupling facet 18 of the first cladding 14 in the form of a six-petal flower.

As described above, the method of manufacturing the optical fiber coupler 41 of the first embodiment of the inventive concept may include a process of forming the coupling facet 18 by etching the first cladding 14 and a process of coupling the second cores 22 having the same numerical aperture as that of the first cladding 14 to the first cladding 14.

Figure 4:
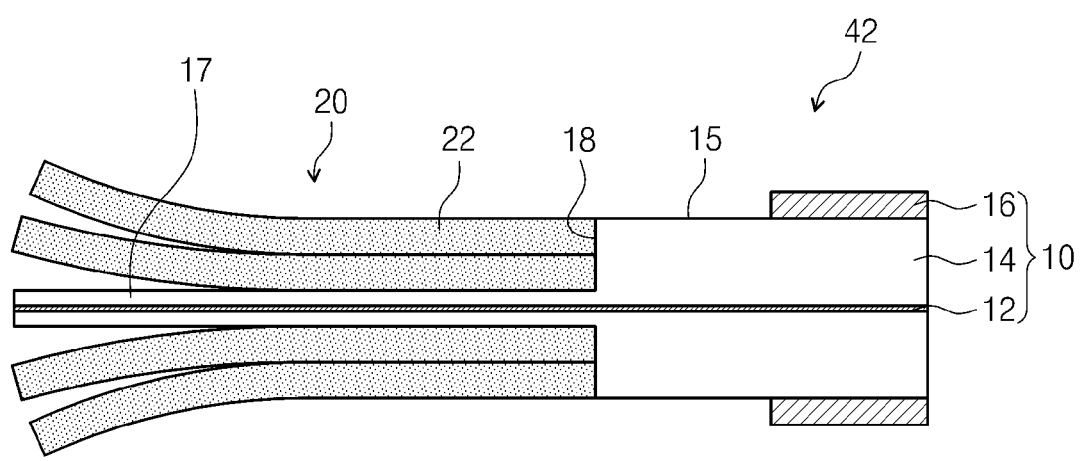
FIG. 4 is a sectional view illustrating an optical fiber coupler according to a second embodiment of the inventive concept.

FIG. 4 is a sectional view illustrating an optical fiber coupler 42 according to a second embodiment of the inventive concept;

Referring to FIG. 4, the optical fiber coupler 42 of the second embodiment may include second optical fibers 20, and the second optical fibers 20 may include second cores 22 coupled to a coupling facet 18 of a first cladding 14 in two layers. For example, second cores 22 of about eighteen optical fibers 20 may be coupled to the coupling facet 18 of the first cladding 14 along the outer circumferential surface of the first cladding 14. A second part 17 of the first cladding 14 surrounded by the second optical fibers 20 may have a second outer diameter equal to the diameter of the second cores 22 of the second optical fibers 20. A first part 15 of the first cladding 14 may have a first outer diameter equal to the inner diameter of a second cladding 16. The coupling facet 18 may correspond to a stepped part between the first and second outer diameters of the first cladding 14. For example, the width of the coupling facet 18 may be equal to the sum of diameters of second cores 22 arranged in a radial direction of the first cladding 14.

The first cladding 14 of a first optical fiber 10 may have the same numerical aperture as that of the second cores 22 of the second optical fibers 20. The second cores 22 of the second optical fibers 20 may have the same diameter as that of the second part 17 of the first cladding 14. The second part 17 of the first cladding 14 may be located on the coupling facet 18 at the center of eighteen second optical fibers 20. If the maximum power of pump light that can be transmitted to the first cladding 14 through an entire section (not shown) of the first cladding 14 is assumed to be 1, about 18/19 of the maximum power of the pump light may be transmitted to the first cladding 14 through the second cores 22 of the second optical fibers 20, and about 1/19 of the maximum power of the pump light may not be transmitted to the second part 17 of the first cladding 14. That is, in the second embodiment of the inventive concept, about 1/19 value may make a structural loss because the pump light cannot be supplied into the second part 17 of the first cladding 14 through the optical fiber coupler 41. Detailed descriptions of the first optical fiber 10 and the second optical fibers 20 will not be repeated because the first optical fiber 10 and the second optical fibers 20 have been described in the first embodiment of the inventive concept.

Accordingly, the optical fiber coupler 42 of the second embodiment of the inventive concept may decrease loss of pump light better than the optical fiber coupler 41 of the first embodiment, and increase coupling efficiency the first optical fiber 10 and the second optical fibers 20.

FIG. 5 is a sectional view illustrating an optical fiber coupler 43 according to a third embodiment of the inventive concept.

Referring to FIG. 5, the optical fiber coupler 43 of the third embodiment of the inventive concept may include a first optical fiber 10 having a first cladding 14. The first cladding 14 may include a first coupling facet 18 and a second coupling facet 28 to which second optical fibers 20 and third optical fibers 30 having different numerical apertures are respectively coupled. The second optical fibers 20 may include multi-mode optical fibers which include second cores 22 and third claddings (not shown) surrounding the second cores 22. The third optical fibers 30 may include third cores 32 and fourth claddings 34. For example, the third optical fibers 30 may include optical fibers which include third cores 32 and fourth claddings 34 and fifth claddings (coating, not shown) sequentially surrounding the third cores 32. The third optical fibers 30 may include commercially available general hard clad silica fiber(105 μm core, 125 μm clad).

The first coupling facet 18 and the second coupling facet 28 may have the same size. The second optical fibers 20 connected to the first coupling facet 18 may have the same numerical aperture as that of the first cladding 14. The third optical fibers 30 connected to the second coupling facet 28 may have a numerical aperture less than that of the second optical fibers 20.

The first cladding 14 may include: a first part 15 having a first outer diameter equal to the inner diameter of a second cladding 16; and a second part 17 having a second outer diameter which is smaller than the first outer diameter owing to the first coupling facet 18 or the second coupling facet 28. For example, the first outer diameter of the first cladding 14 may be about 375 μm, and the second outer diameter of the first cladding 14 may be about 125 μm.

In addition, the first cladding 14 may further include a tapered region 19 located between the first coupling facet 18 and the second coupling facet 28. The outer diameter of the tapered region 19 may continuously decrease from the first outer diameter value to the second outer diameter value in a direction where the second optical fibers 20 and the third optical fibers 30 are coupled.

The numerical aperture of the first cladding 14 may be varied in the tapered region 19. As the outer diameter of the first cladding 14 is increased in the tapered region 19, the numerical aperture of the first cladding 14 may be decreased. In the case where the second outer diameter of the first cladding 14 is equal to the width of the first coupling facet 18, the numerical aperture of the tapered region 19 of the first cladding 14 at the second coupling facet 28 may be less than the numerical aperture of the tapered region 19 at the first coupling facet 18 by a value corresponding to the amount of increased outer diameter of the tapered region 19. The reason for this is that the BPP defined as the product of an outer diameter and a numerical aperture is constant. In the tapered region 19, the product of the second outer diameter and numerical aperture of the first cladding 14 (second part 17) at the first coupling facet 18 may correspond to the product of the maximum outer diameter and numerical aperture of the tapered region 19 at the second coupling facet 28. If the maximum outer diameter of the tapered region 19 is about three times larger than the second outer diameter of the first cladding 14, the numerical aperture at the second coupling facet 28 may have a lower value of about ⅓ than the numerical aperture at the first coupling facet 18. In this case, the numerical aperture of the third optical fibers 30 connected to the second coupling facet 28 may be about ⅓ the numerical aperture of the second optical fibers 20.

For example, the first outer diameter and numerical aperture of the first cladding 14 may be about 375 μm and about 0.46, respectively. In addition, the diameter of the second cores 22 of the second optical fibers 20 may be about 125 μm, and the numerical aperture of the second cores 22 may be about 0.46 like the first cladding 14. The width of the first coupling facet 18 may be about 125 μm. The second outer diameter of the second part 17 of the first cladding 14 between the first coupling facet 18 and the second coupling facet 28 may be about 125 μm. In addition, the first cladding 14 may have the tapered region 19 between the first coupling facet 18 and the second coupling facet 28. The maximum outer diameter of the tapered region 19 may be increased about 375 μm corresponding to the first outer diameter of the first cladding 14 while the size of the first core 12 is not varied. In this case, by the constant BPP, the numerical aperture of the tapered region 19 at the second coupling facet 28 may be reduced to about ⅓ of the numerical aperture of the tapered region 19 at the first coupling facet 18. The third cores 32 and the fourth claddings 34 of the third optical fibers 30 coupled to the second coupling facet 28 may have a diameter of about 125 μm and a numerical aperture of about 0.15, respectively.

The maximum power of pump light that can be transmitted to the first cladding 14 through an entire section (not shown) of the first cladding 14 is assumed to be 1. In the third embodiment of the inventive concept, unlike in the first embodiment, pump light can be supplied through the third optical fibers 30 to the second part 17 of the first cladding 14 having the second outer diameter and disposed close to the first coupling facet 18. Thus, a supply loss of pump light may be about 1/49 (1/7×1/7) because pump light cannot be supplied through the second part 17 of the first cladding 14 which is centered in the second coupling facet 28. That is, the optical fiber coupler 43 of the third embodiment of the inventive concept may have a structural loss of pump light of about 1/49.

Therefore, the optical fiber coupler 43 according to the third embodiment of the inventive concept may have a lowest structural loss of pump light as compared with the optical fiber couplers 41, and 42 of the first or second embodiment, and thus the coupling efficiency of the optical fiber coupler 43 can be improved or optimized.

An explanation will now be given on a method of manufacturing the optical fiber coupler 43 of the third embodiment of the inventive concept.

Figure 6C:
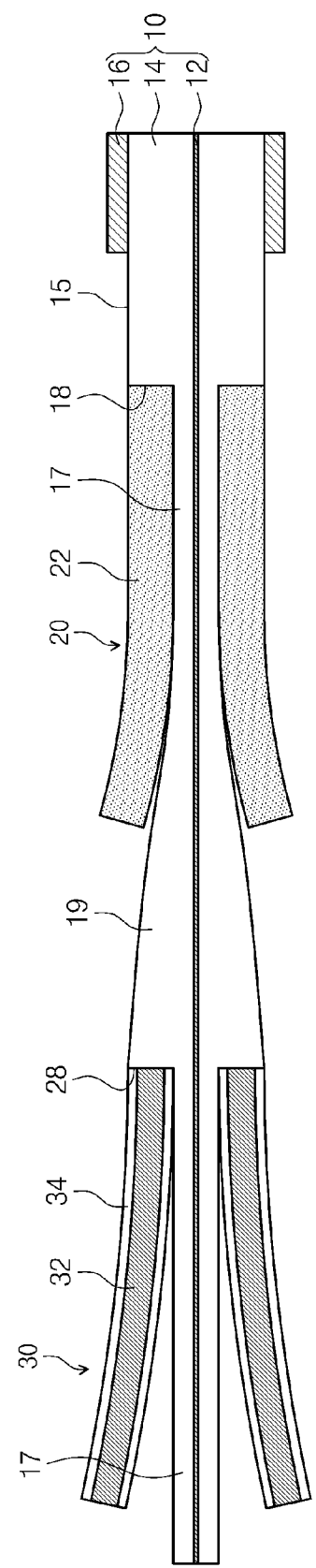

FIGS. 6A through 6C are sequential sectional views for explaining a method of manufacturing an optical fiber coupler 43 of the third embodiment of the inventive concept.

Referring to FIG. 6A, a first cladding 14 may be exposed by partially removing a second cladding 16 of a first optical fiber 10. The second cladding 16 may be partially removed by a mechanical stripper or a chemical etch.

Referring to FIG. 6B, a part of the first cladding 14 may be reshaped to a first coupling facet 18, a tapered region 19, and a second coupling facet 28 using various etching methods. The first cladding facet 18, the tapered region 19, and the second coupling facet 28 may be formed by partially removing the first cladding 14 through a wet etching method or a dry etching method. A wet etching method and a dry etching method may be used together. The first coupling facet 18, the tapered region 19, and the second coupling facet 28 may be sequentially formed by a wet etching method or a dry etching method.

Referring to FIG. 6C, second optical fibers 20 and the third optical fibers 30 may be coupled to the first coupling facet 18 and the second coupling facet 28, respectively. The second optical fibers 20 and the third optical fibers 30 may have the same diameter but different numerical apertures. At least one of second cores 22 of the second optical fibers 20 may be tied in a bundle around the first cladding 14 at a position and spliced to the first coupling facet 18. At least one of third cores 32 and fourth claddings 34 of the third optical fibers 30 may be tied in a bundle around the first cladding 14 at a position and spliced to the second coupling facet 28. The second optical fibers 20 and the third optical fibers 30 may surround a second part 17 of the first cladding 14 and extend in a direction parallel with a first core 12. The second optical fibers 20 and the third optical fibers 30 may be fused to the first coupling facet 18 and the second coupling facet 28, respectively, by using a micro torch, an electric heater, or a $CO_2$ laser.

Figure 7:
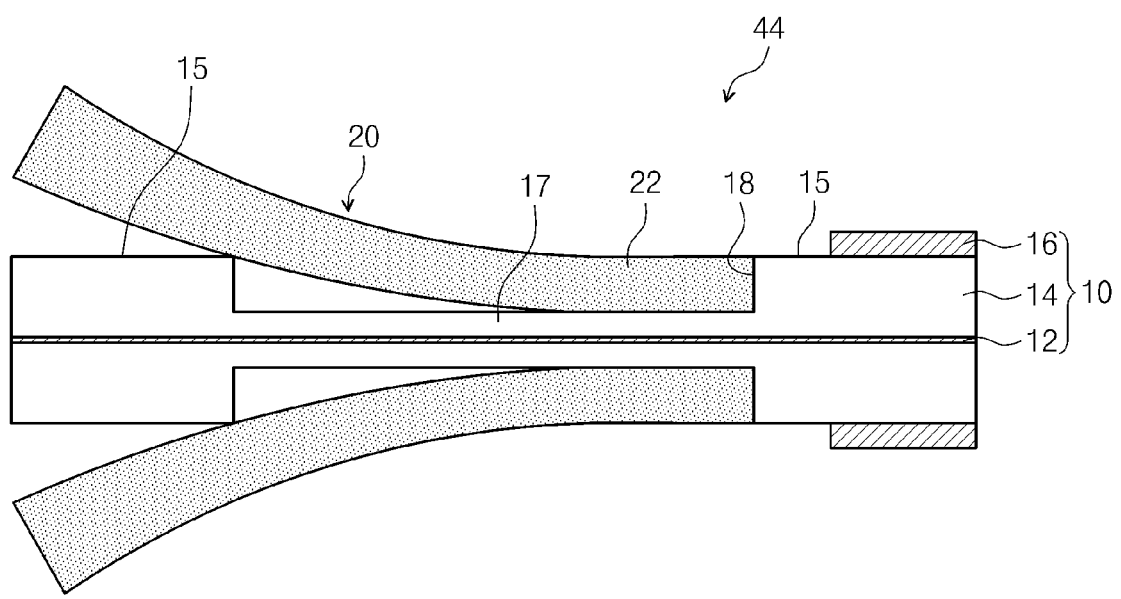
FIG. 7 is a sectional view illustrating an optical fiber coupler according to a fourth embodiment of the inventive concept.

FIG. 7 is a sectional view illustrating an optical fiber coupler 44 according to a fourth embodiment of the inventive concept.

Referring to FIG. 7, according to the fourth embodiment of the inventive concept, the optical fiber coupler 44 may include second optical fibers 20 having second cores 22. The second cores 22 may have a diameter equal to or similar to the diameter of a first cladding 14 of a first optical fiber 10 and may be tapered at a position close to a coupling facet 18 of the first cladding 14. The first cladding 14 of the first optical fiber 10 may have a numerical aperture different from that of the second optical fibers 20. The second optical fibers 20 may have a numerical aperture smaller than that of the first cladding 14. The second optical fibers 20 may include multi-mode optical fibers.

At the tapered parts of the second cores 22, the numerical aperture of the second cores 22 may be increased as the diameter of the second cores 22 is continuously decreased. The reason for this is that the second cores 22 have a constant BPP although the diameter of the second cores 22 is decreased. For example, the diameter and numerical aperture of ends of the tapered parts of the second cores 22 may be about 125 µm and about 0.15, respectively, and the diameter and numerical aperture of the other ends of the tapered parts of the second cores 22 may be about 41.6 µm and about 0.45, respectively.

The first cladding 14 of the first optical fiber 10 may have a first part 15 having a first outer diameter equal to the inner diameter of a second cladding 16, and a second part 17 having a second outer diameter smaller than the first outer diameter. For example, the first outer diameter and numerical aperture of the first part 15 of the first cladding 14 may be about 125 µm and about 0.46, respectively. The second outer diameter of the second part 17 of the first cladding 14 may be about 41.6 µm. Therefore, at the coupling facet 18, the tapered parts of the second cores 22 may have the same numerical aperture as that of the first cladding 14. Loss of pump light at the coupling facet 18 can be minimized because the first cladding 14 of the first optical fiber 10 and the tapered parts of the second cores 22 have the same numerical aperture at the coupling facet 18. Therefore, according to the fourth embodiment of the inventive concept, the optical fiber coupler 44 may have improved or optimized coupling efficiency. The tapered parts of the second cores 22 may surround the second part 17 of the first cladding 14 in double layers (not shown).

FIG. 8 is a sectional view illustrating an optical fiber coupler 45 according to a fifth embodiment of the inventive concept.

Referring to FIG. 8, according to the fifth embodiment of the inventive concept, the optical fiber coupler 45 may include a first optical fiber 10 having an up-tapered region 11 the outer diameter of which is continuously increased from a first part 15. The first optical fiber 10 may include a first core 12, a first cladding 14, and a second cladding 16. Second cores 22 having the same diameter as a first outer diameter of the first part 15 of the first cladding 14 may be coupled to a coupling facet 18 of the first cladding 14. In the up-tapered region 11, the outer diameters of the first core 12 and the first cladding 14 may be gradually increased. In the up-tapered region 11, the outer diameter of the first cladding 14 may be gradually increased from the first outer diameter to a third outer diameter. In the up-tapered region 11, the numerical aperture of the first cladding 14 may be decreased but the BPP of the first cladding 14 may be constant. For example, the first outer diameter and numerical aperture of the first cladding 14 may be about 125 µm and about 0.46, respectively. At a third part 13 in the up-tapered region 11, the third outer diameter and numerical aperture of the first cladding 14 may be about 375 µm and about 0.15, respectively. In the up-tapered region 11, the outer diameter of the first core 12 may be increased at the same rate as the first cladding 14.

The coupling facet 18 may be vertical or oblique to a direction in which the first core 12 extends. For example, the numerical aperture at the coupling facet 18 may be about 0.15, and the width of the coupling facet 18 may be about 125 µm. The diameter of the first core 12 may be greater in a second part 17 of the first cladding 14 than in the second cladding 16.

The second cores 22 of the second optical fibers 20 may extend along the second part 17 of the first cladding 14 in a direction parallel with the second part 17 and may be connected to the coupling facet 18. The second cores 22 of the second optical fibers 20 may have the same diameter as that of the second part 17 of the first cladding 14. For example, six second optical fibers 20 may surround the second part 17 of the first cladding 14. The diameter and numerical aperture of the second cores 22 of the second optical fibers 20 may be about 125 µm and about 0.15, respectively.

In the case where the first optical fiber 10 has a numerical aperture greater than that of the second optical fibers 20, the first optical fiber 10 may include the up-tapered region 11 where the outer diameters of the first core 12 and the first cladding 14 increase continuously. In the up-tapered region 11, as the outer diameter of the first cladding 14 increases, the numerical aperture of the first cladding 14 may decrease accordingly because the BPP of the first cladding 14 is constant. At the coupling facet 18, the first cladding 14 and the second optical fibers 20 may have the same numerical aperture. The first cladding 14 may have the same refractive index as that of the second optical fibers 20 and the same numerical aperture as that of the second optical fibers 20 at the coupling facet 18. According to the fifth embodiment of the inventive concept, the coupling efficiency of the optical fiber coupler 45 can be improved or optimized. In the fifth embodiment of the inventive concept, the optical fiber coupler 45 may have a structural loss of pump light of about ⅐.

An explanation will now be given on a method of manufacturing the optical fiber coupler 45 of the fifth embodiment of the inventive concept.

FIGS. 9A through 9D are sequential sectional views for explaining a method of manufacturing an optical fiber coupler 45 of the fifth embodiment of the inventive concept.

Figure 9A:
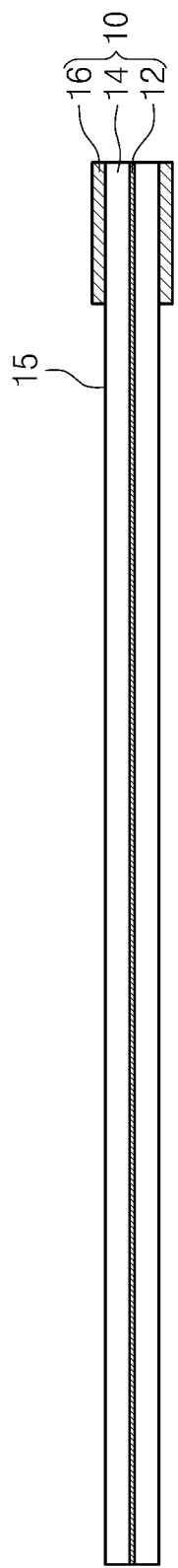

Referring to FIG. 9A, a second cladding 16 of a first optical fiber 10 is partially removed to expose a first cladding 14. As described above, the second cladding 16 may be partially removed by an etching method.

Figure 9B:
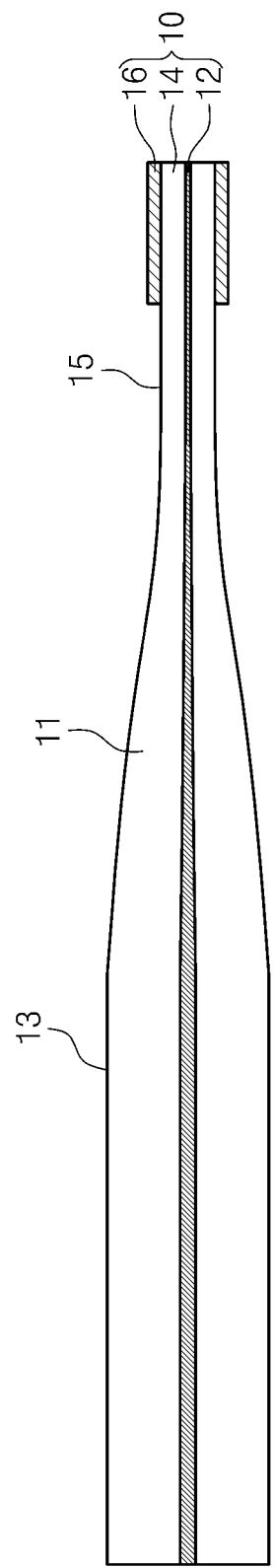

Referring to FIG. 9B, an up-tapered region 11 may be formed by applying a compressed force in a heated state. The outer diameter of the first cladding 14 and the first core 12 may be expanded by a micro torch or an electric heater on a translational stage. In the up-tapered region 11, the outer diameters of the first cladding 14 and the first core 12 may be increased continuously or gradually. The outer diameters of the first cladding 14 and the first core 12 may be increased while the lengths of the first cladding 14 and the first core 12 are reduced by contraction. The up-tapered region 11 may be formed by using a predetermined mold. For example, the first cladding 14 having a first outer diameter of about 125 µm may be increased to a third outer diameter of about 375 µm at a third part 13 of the up-tapered region 11.

Referring to FIG. 9C, a part of the first cladding 14 close to the third part 13 of the up-tapered region 11 may be removed to form a coupling facet 18. The coupling facet 18 may be formed by partially removing the first cladding 14 by a wet or dry etching method. The coupling facet 18 may be vertical or oblique to the first core 12 of the first optical fiber 10. For example, the outer diameter of the first cladding 14 may be reduced by the etching process from the third outer diameter of about 375 µm to a second outer diameter of about 125 µm. In this case, the width of the coupling facet 18 may be about 125 µm.

Referring to FIG. 9D, second cores 22 of second optical fibers 20 may be coupled to the coupling facet 18. At least one of the second cores 22 of the second optical fibers 20 may be tied in a bundle around the first cladding 14. The second optical fibers 20 may be tied in a bundle around the first optical fiber 10 by using a clamp (not shown). The second cores 22 may surround a second part 17 of the first cladding 14 having a second outer diameter and extend in a direction parallel with the first core 12. The second optical fibers 20 may be fused to the first coupling facet 18 by using a micro torch, an electric heater, or a $CO_2$ laser.

Therefore, according to the method of manufacturing the optical fiber coupler 45 of the fifth embodiment of the inventive concept, the up-tapered region 11 and the coupling facet 18 may be formed on the first cladding 14 of the first optical fiber 10 having a numerical aperture greater than that of the second optical fibers 20, and then the second optical fibers 20 may be coupled to the coupling facet 18.

Figure 10:
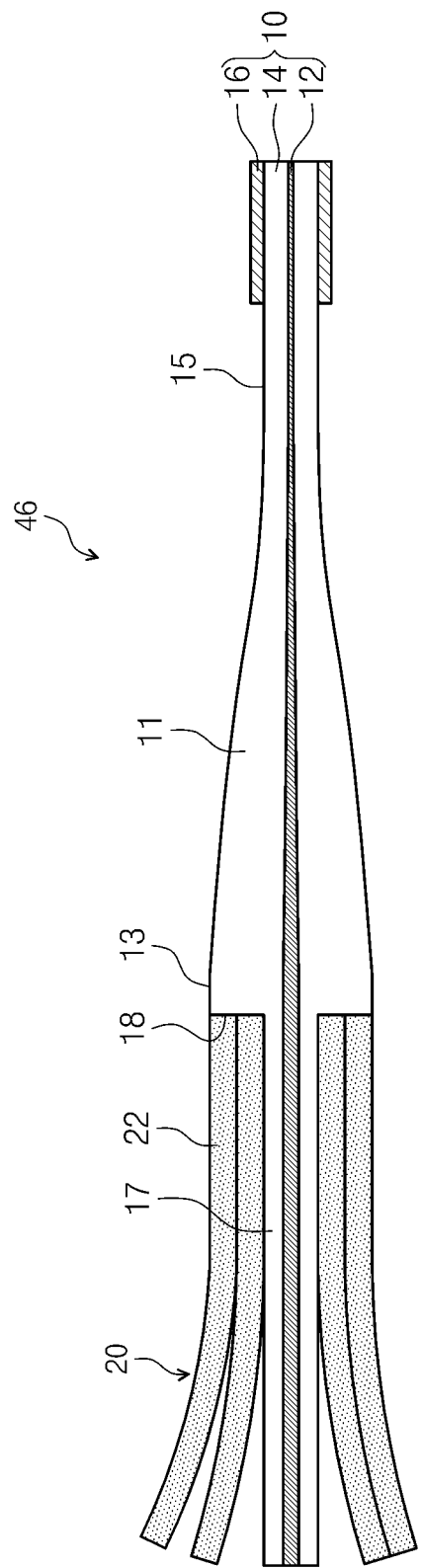
FIG. 10 is a sectional view illustrating an optical fiber coupler according to a sixth embodiment of the inventive concept.

FIG. 10 is a sectional view illustrating an optical fiber coupler 46 according to a sixth embodiment of the inventive concept.

Referring to FIG. 10, according to the sixth embodiment of the inventive concept, the optical fiber coupler 46 may include second optical fibers 20 including second cores 22. The second cores 22 may be coupled in two layers to a coupling facet 18 close to an up-tapered region 11 of a first cladding 14. For example, about eighteen second cores 22 of second optical fibers 20 may be coupled to the coupling facet 18 of the first cladding 14 along a second part 17 of the first cladding 14. The second part 17 of the first cladding 14 surrounded by the second cores 22 may have a second outer diameter equal to the diameter of the second cores 22 of the second optical fibers 20.

The first cladding 14 may include a first part 15 having a first outer diameter equal to the inner diameter of a second cladding 16. The first cladding 14 may include a third part 13 having a third outer diameter, which is greater than the first outer diameter owing to the up-tapered region 11. The coupling facet 18 may correspond to the difference between the third outer diameter and the second outer diameter of the first cladding 14. The second outer diameter may be equal to the first outer diameter. The first part 15 of the first cladding 14 having the first outer diameter may have a numerical aperture different from the numerical aperture of the second part 17 of the first cladding 14 having the second outer diameter. Since the first cladding 14 has a constant BPP, the numerical aperture of the second part 17 of the first cladding 14 may decrease as the outer diameter of the first cladding 14 increases in the up-tapered region 11.

In the up-tapered region 11, the numerical aperture of the first cladding 14 may decrease as it goes to the coupling facet 18. The numerical aperture of the first cladding 14 at the coupling facet 18 may be equal to the numerical aperture of the second cores 22 of the second optical fibers 20. The second cores 22 of the second optical fibers 20 may have the same outer diameter as the second outer diameter of the second part 17 of the first cladding 14. The width of the coupling facet 18 may be equal to the sum of the diameters of the second cores 22 of the second optical fibers 20 disposed in two layers around the second part 17 of the first cladding 14 in a radial direction.

On the coupling facet 18, the second part 17 of the first cladding 14 may be disposed at the center of eighteen second optical fibers 20. If the maximum power of pump light that can be transmitted to the first cladding 14 through an entire section (not shown) of the first cladding 14 is assumed to be 1, about $18/19$ of the maximum power of the pump light may be transmitted to the first cladding 14 through the second cores 22 of the second optical fibers 20. About $1/19$ of the maximum power of the pump light may not be transmitted to the second part 17 of the first cladding 14. That is, in the sixth embodiment of the inventive concept, about $1/19$ of pump light may be lost while the pump light is supplied through the optical fiber coupler 46. Therefore, in the optical fiber coupler 46 of the sixth embodiment of the inventive concept, a supply loss of pump light can be reduced, and coupling efficiency can be improved or optimized, as compared with the optical fiber coupler 45 of the fifth embodiment of the inventive concept.

The optical fiber couplers 41 to 46 of the first to sixth embodiments of the inventive concept may be used for optical fiber lasers and optical amplifiers that operate in forward pumping mode and backward pumping mode. The optical fiber lasers and optical amplifiers may also operate in bidirectional pumping mode in which forward pumping mode and backward pumping mode are mixed, and in multiple forward pumping mode. Here, the direction in which the second optical fibers 20 are coupled to the coupling facet (18, 28) of the first optical fiber 10 may be defined as an incident direction of pump light. In forward pumping mode, the incident direction of pump light may be equal to the output direction of laser light generated by the pump light. In backward pumping mode, the incident direction of pump light may be opposite to the output direction of laser light generated by the pump light.

Thus, the kind of active optical module, in which the optical fiber couplers 41 to 46 of the first to sixth embodiments of the inventive concept can be operated, may be varied according to optical devices disposed at both ends of the first optical fiber 10.

Hereinafter, according to embodiments of the inventive concept, explanations will be given on active optical modules having various pumping modes according to optical devices disposed at both ends of a first optical fiber 10 in which an optical fiber coupler 40 is disposed.

FIGS. 11A through 11D are schematic views illustrating an active optical module 60 according to the first embodiment of the inventive concept.

Referring to FIGS. 11A through 11D, according to the first embodiment of the inventive concept, the active optical module 60 may include a continuous output laser 60 (denoted by the same reference numeral as that for the active optical module 60) in which first and second mirrors 62 and 64 are disposed at both ends of a first optical fiber 10. The continuous output laser 60 may generate laser light having a single wavelength band. In detail, if pump light is incident from pump light sources 50 to a first core 12 of the first optical fiber 10, laser light may be generated from the first core 12 of the first optical fiber 10 disposed between the first and second mirrors 62 and 64.

Laser light generated in the first optical fiber 10 may resonate between the first and second mirrors 62 and 64. The first mirror 62 may reflect about 100% of incident laser light, and the second mirror 64 may reflect about 5% to 20% of incident light. The first mirror 62 may include a fiber Bragg grating (FBG) or a full mirror that can reflect all incident light. The second mirror 64 may include an output coupler or an FBG that can partially transmit laser light. Laser light oscillating between the first and second mirrors 62 and 64 may be output to an end cap 68 or a collimator through a pigtail optical fiber 18 extending from the second mirror 64.

Referring to FIG. 11A, the active optical module 60 of the first embodiment of the inventive concept may have a forward pumping mode in which an optical fiber coupler 40 is disposed in a direction from the first mirror 62 to the second mirror 64. Laser light may be output from the second mirror 64 to the end cap 68 through the pigtail optical fiber 18 of the first optical fiber 10. The optical fiber coupler 40 may be disposed at a position close to the first mirror 62. Pump light may be sufficiently absorbed while it propagates along the first optical fiber 10 extending from the first mirror 62 to the second mirror 64. Therefore, in forward pumping mode, the propagation direction of pump light in the first optical fiber 10 may be equal to the output direction of laser light. Furthermore, in forward pumping mode, the coupling direction of second optical fibers 20 to the first optical fiber 10 may be equal to the output direction of laser light.

Referring to FIG. 11B, the active optical module 60 of the first embodiment of the inventive concept may have a backward pumping mode in which the optical fiber coupler 40 is disposed in a direction from the second mirror 64 to the first mirror 62. The optical fiber coupler 40 may be coupled to the first optical fiber 10 at a position close to the second mirror 64. Pump light transmitted through the second optical fibers 20 may be sufficiently absorbed while it propagates along the first optical fiber 10 extending from the second mirror 64 to the first mirror 62. Therefore, in backward pumping mode, the propagation direction of pump light in the first optical fiber 10 may be opposite to the output direction of laser light.

Referring to FIG. 11C, the active optical module 60 of the first embodiment of the inventive concept may include a bidirectional pumping mode in which a plurality of mutually facing optical fiber couplers 40 are disposed in the first optical fiber 10 at positions close to the first and second mirrors 62 and 64. The optical fiber couplers 40 may supply pump light in opposite directions to the first optical fiber 10 disposed between the first and second mirrors 62 and 64. The optical fiber coupler 40 disposed at a position of the first optical fiber 10 close to the first mirror 62 may be oriented in a forward direction, and the optical fiber coupler 40 disposed at a position of the first optical fiber 10 close to the second mirror 64 may be oriented in a backward direction. Pump light may be sufficiently absorbed by the first core 12 while it propagates along the first optical fiber 10 between the first and second mirrors 62 and 64. Therefore, in bidirectional pumping mode, laser light may be generated by pump light supplied in opposite directions to the first optical fiber 10 between the first and second mirrors 62 and 64.

Referring to FIG. 11D, the active optical module 60 of the first embodiment of the inventive concept may include a multiple forward pumping mode in which a plurality of optical fiber couplers 40 are disposed in the same direction in the first optical fiber 10. The optical fiber couplers 40 may supply pump light to the first optical fiber 10 in the same direction from the first mirror 62 to the second mirror 64. The optical fiber couplers 40 may be oriented in a forward direction between the first and second mirrors 62 and 64. If pump light supplied from a first optical fiber coupler 40 is exhausted, pump light may be supplied from a second optical fiber coupler 40, so that the output of laser light may be sequentially increased. The intensity of pump light supplied through the second optical fiber coupler 40 may be greater than the intensity of light supplied through the first optical fiber coupler 40.

FIGS. 12A through 12D are schematic views illustrating an active optical module 70 according to the second embodiment of the inventive concept.

Referring to FIGS. 12A through 12D, according to the second embodiment of the inventive concept, the active optical module 70 may include a Q switching laser 70 or a mode locking laser 70 (denoted by the same reference numeral as the active optical module 70), in which a first mirror 62 and a modulator 76 are disposed at a side of a first optical fiber 10 close to an optical fiber coupler 40, and a second mirror 64 is disposed at the other side of the first optical fiber 10. The Q switching laser or mode locking laser 70 may generate pulse laser light. Laser light may be generated from a first core 12 of the first optical fiber 10 disposed between the first and second mirrors 62 and 64. Laser light may resonate between the first and second mirrors 62 and 64.

The modulator 76 may modulate laser light by using an analog or digital electric signal. The modulator 76 may generate pulse laser light by switching laser light oscillating between the first and second mirrors 62 and 64. That is, the modulator 76 may generate pulse laser light through periodic on-off operations. For example, pulse laser light may be generated when the modulator 76 is turned on and not generated when the modulator 76 is turned off.

The first mirror 62 may reflect about 100% of incident laser light, and the second mirror 64 may reflect about 5% to 20% of incident light. The first mirror 62 may include a fiber Bragg grating (FBG) or a full mirror that can reflect all incident light. The second mirror 64 may include an output coupler or an FBG that can partially transmit laser light. Laser light oscillating between the first and second mirrors 62 and 64 may be output to an end cap 68 or a collimator through a pigtail optical fiber 18 extending from the second mirror 64.

Referring to FIG. 12A, the active optical module 70 of the second embodiment of the inventive concept may include a forward pumping mode in which the optical fiber coupler 40 is disposed in a direction from the first mirror 62 to the second mirror 64. In this case, pulse laser light may be output from the second mirror 64 to the end cap 68 through the pigtail optical fiber 18. The optical fiber coupler 40 may be disposed on the first optical fiber 10 at a position close to the first mirror 62. Pump light may be sufficiently absorbed while it propagates along the first optical fiber 10 extending from the first mirror 62 to the second mirror 64. In forward pumping mode, the propagation direction of pump light in the first optical fiber 10 may be equal to the output direction of pulse laser light.

Referring to FIG. 12B, the active optical module 70 of the second embodiment of the inventive concept may include a backward pumping mode in which the optical fiber coupler 40 is disposed in a direction from the second mirror 64 to the first mirror 62. The optical fiber coupler 40 may be disposed on the first optical fiber 10 at a position close to the second mirror 64. Pump light may be sufficiently absorbed while it propagates along the first optical fiber 10 extending from the second mirror 64 to the first mirror 62. Therefore, in backward pumping mode, the propagation direction of pump light in the first optical fiber 10 may be opposite to the output direction of pulse laser light.

Figure 12C:
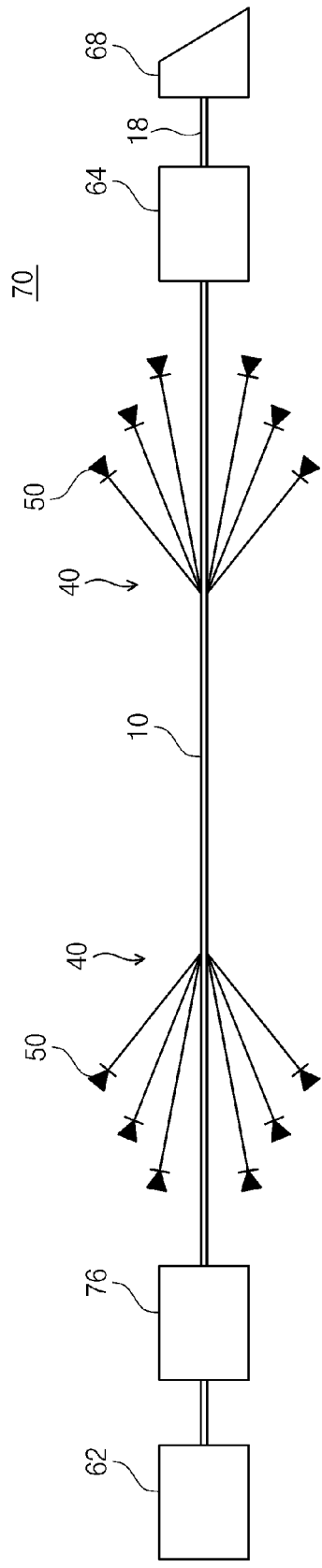

Referring to FIG. 12C, the active optical module 70 of the second embodiment of the inventive concept may include a bidirectional pumping mode in which a plurality of mutually facing optical fiber couplers 40 are disposed in the first optical fiber 10 at positions close to the first and second mirrors 62 and 64. The optical fiber couplers 40 may supply pump light in opposite directions to the first optical fiber 10 disposed between the first and second mirrors 62 and 64. The optical fiber coupler 40 disposed at a position of the first optical fiber 10 close to the first mirror 62 may be oriented in a forward direction, and the optical fiber coupler 40 disposed at a position of the first optical fiber 10 close to the second mirror 64 may be oriented in a backward direction. Pump light may be sufficiently absorbed by the first core 12 while it propagates along the first optical fiber 10 between the first and second mirrors 62 and 64. Therefore, in bidirectional pumping mode, pulse laser light may be generated by pump light supplied in opposite directions to the first optical fiber 10 between the first and second mirrors 62 and 64.

Figure 12D:
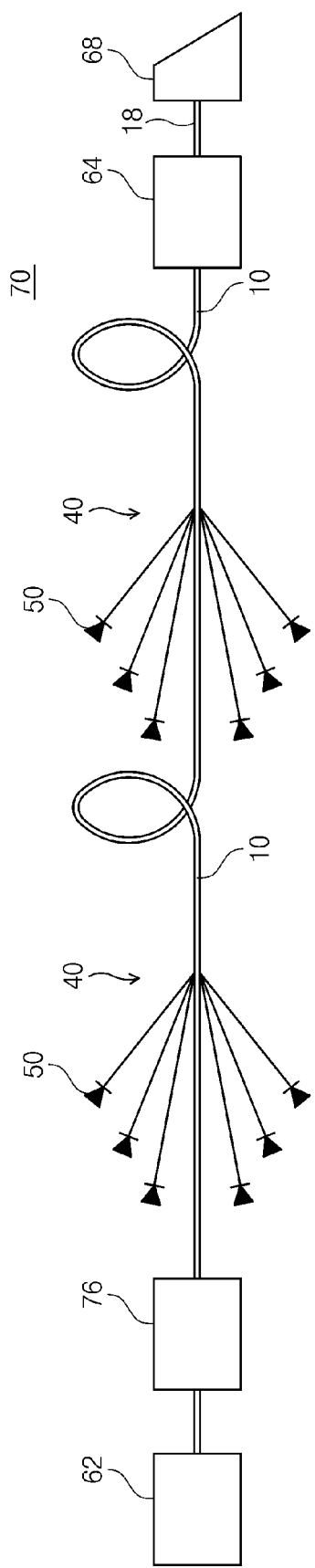

Referring to FIG. 12D, the active optical module 70 of the second embodiment of the inventive concept may include a multiple forward pumping mode in which a plurality of optical fiber couplers 40 are disposed in the same direction in the first optical fiber 10 between the first and second mirrors 62 and 64. The optical fiber couplers 40 may supply pump light to the first optical fiber 10 in the same direction. The optical fiber couplers 40 may be oriented in a forward direction between the first and second mirrors 62 and 64. If pump light supplied from a first optical fiber coupler 40 is exhausted, pump light may be supplied from a second optical fiber coupler 40, so that the output of laser light may be sequentially increased. The intensity of pump light supplied through the second optical fiber coupler 40 may be greater than the intensity of light supplied through the first optical fiber coupler 40.

FIGS. 13A through 13D are sectional views illustrating an active optical module 80 according to the third embodiment of the inventive concept.

Referring to FIGS. 13A through 13D, according to the third embodiment of the inventive concept, the active optical module 80 may include a laser light amplifier 80 (denoted by the same reference numeral as the active optical module 80), in which a signal source 86 and a first isolator 82 are disposed at a side of an optical fiber coupler 40, and a second isolator 84 is disposed at the other side of the optical fiber coupler 40. The laser light amplifier 80 may amplify laser light by using pump light transmitted through the optical fiber coupler 40. The signal source 86 may include a semiconductor light source, an output end of another optical amplifier 80, or an optical fiber laser. Pump light may be supplied from pump light sources 50 to a first optical fiber 10. Laser light may be output by amplifying a signal input from the signal source 86. That is, the laser light amplifier 80 may output laser light amplified according to a signal of the signal source 86.

By the first isolator 82 and the second isolator 84, laser light may be transmitted to an end cap 68 along a first optical fiber 10. The first isolator 82 may transmit a signal output from the signal source 86. However, the first isolator 82 may block laser light returning to the signal source 86. The second isolator 84 may transmit laser light propagating to the end cap 68 through a pigtail optical fiber 18. However, the second isolator 84 may block laser light returning to the first optical fiber 10 from the end cap 68 through the pigtail optical fiber 18. The second isolator 84 may be omitted.

Referring to FIG. 13A, the active optical module 80 of the third embodiment of the inventive concept may include a forward pumping mode in which the optical fiber coupler 40 is disposed in a direction from the first isolator 82 to the second isolator 84. Laser light may be output from the second isolator 84 to the end cap 68 through the pigtail optical fiber 18. The optical fiber coupler 40 may be disposed on the first optical fiber 10 at a position close to the first isolator 82. Pump light may be sufficiently absorbed while it propagates along the first optical fiber 10 extending from the first isolator 82 to the second isolator 84. Therefore, in forward pumping mode, the propagation direction of pump light in the first optical fiber 10 may be equal to the output direction of amplified laser light.

Referring to FIG. 13B, the active optical module 80 of the third embodiment of the inventive concept may include a backward pumping mode in which the optical fiber coupler 40 is disposed in a direction from the second isolator 84 to the first isolator 82. The optical fiber coupler 40 may be coupled to the first optical fiber 10 at a position close to the second isolator 84. Pump light may be sufficiently absorbed while it propagates along the first optical fiber 10 extending from the second isolator 84 to the first isolator 82. Therefore, in backward pumping mode, the propagation direction of pump light in the first optical fiber 10 may be opposite to the output direction of amplified laser light.

Figure 13C:
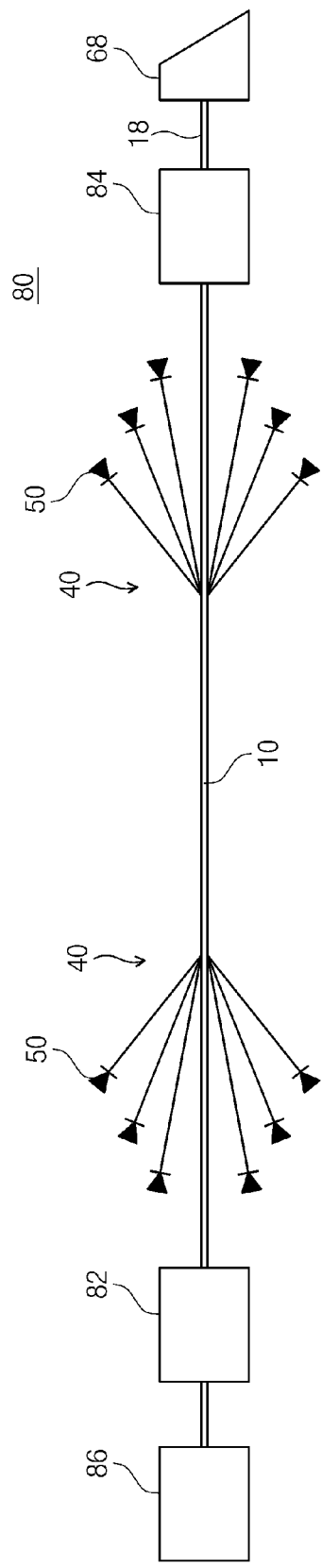

Referring to FIG. 13C, the active optical module 80 of the third embodiment of the inventive concept may include a bidirectional pumping mode in which a plurality of mutually facing optical fiber couplers 40 are disposed in the first optical fiber 10 at positions close to the first and second isolators 82 and 84. The first isolator 82 and the second isolator 84 may block laser light propagating in a backward direction. The optical fiber coupler 40 disposed at a position of the first optical fiber 10 close to the first isolator 82 may be oriented in a forward direction, and the optical fiber coupler 40 disposed at a position of the first optical fiber 10 close to the second isolator 84 may be oriented in a backward direction. Pump light may be absorbed while it propagates along the first optical fiber 10 between the first and second isolators 82 and 84. Therefore, in bidirectional pumping mode, amplified laser light may be generated by pump light supplied in opposite directions to the first optical fiber 10 between the first and second isolators 82 and 84.

Figure 13D:
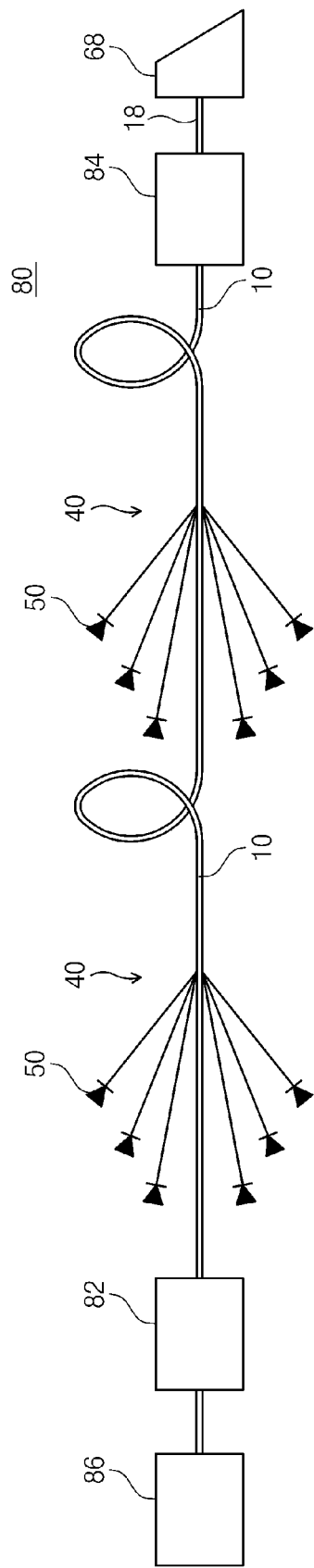

Referring to FIG. 13D, the active optical module 80 of the third embodiment of the inventive concept may include a multiple forward pumping mode in which a plurality of optical fiber couplers 40 are disposed along the first optical fiber 10 between the first and second isolators 82 and 84. The optical fiber couplers 40 may be oriented in the same direction from the first isolator 82 to the second isolator 84. Pump light may be supplied from the optical fiber couplers 40 to the first optical fiber 10 extending from the first isolator 82 to the second isolator 84. The optical fiber couplers 40 may be disposed between the first isolator 82 and the second isolator 84. If pump light supplied from a first optical fiber coupler 40 is exhausted, pump light may be supplied from a second optical fiber coupler 40, so that laser light may be sequentially amplified. The intensity of pump light supplied through the second optical fiber coupler 40 may be greater than the intensity of light supplied through the first optical fiber coupler 40.

FIGS. 14A through 14D are sectional views illustrating an active optical module 90 according to the fourth embodiment of the inventive concept.

Referring to FIGS. 14A through 14D, according to the fourth embodiment of the inventive concept, the active optical module 90 may include a master oscillator-power-amplifier (MOPA) optical fiber amplifier 80 (denoted by the same reference numeral as the active optical module 90), in which a master oscillator 96 and a first isolator 82 are disposed at a side of an optical fiber coupler 40, and a second isolator 84 is disposed at the other side of the optical fiber coupler 40. The MOPA optical fiber amplifier 90 may amplify laser light by using pump light transmitted through the optical fiber coupler 40. Pump light may be supplied from pump light sources 50 to a first optical fiber 10 through the optical fiber coupler 40. Laser light may be output as pulse laser light according to a pulse signal input from the master oscillator 96. The master oscillator 96 may include a frequency oscillator configured to generate a pulse signal.

By the first isolator 82 and the second isolator 84, laser light may be transmitted to an end cap 68 along the first optical fiber 10. The first isolator 82 may transmit a signal output from the master oscillator 96. However, the first isolator 82 may block laser light returning to the master oscillator 96. The second isolator 84 may transmit laser light propagating to the end cap 68 through a pigtail optical fiber 18. However, the second isolator 84 may block laser light returning to the first optical fiber 10 from the end cap 68 through the pigtail optical fiber 18. The second isolator 84 may be omitted.

Referring to FIG. 14A, the active optical module 90 of the fourth embodiment of the inventive concept may include a forward pumping mode in which the optical fiber coupler 40 is disposed in a direction from the first isolator 82 to the second isolator 84. Pulse laser light may be output from the second isolator 84 to the end cap 68 through the pigtail optical fiber 18. The optical fiber coupler 40 may be coupled to the first optical fiber 10 at a position close to the first isolator 82. Pump light may be sufficiently absorbed while it propagates along the first optical fiber 10 extending from the first isolator 82 to the second isolator 84. Therefore, in forward pumping mode, the propagation direction of pump light in the first optical fiber 10 may be equal to the output direction of amplified pulse laser light.

Referring to FIG. 14B, the active optical module 90 of the fourth embodiment of the inventive concept may include a backward pumping mode in which the optical fiber coupler 40 is disposed in a direction from the second isolator 84 to the first isolator 82. The optical fiber coupler 40 may be disposed on the first optical fiber 10 at a position close to the second isolator 84. Pump light may be sufficiently absorbed while it propagates along the first optical fiber 10 extending from the second isolator 84 to the first isolator 82. Therefore, in backward pumping mode, the propagation direction of pump light in the first optical fiber 10 may be opposite to the output direction of amplified pulse laser light.

Figure 14C:
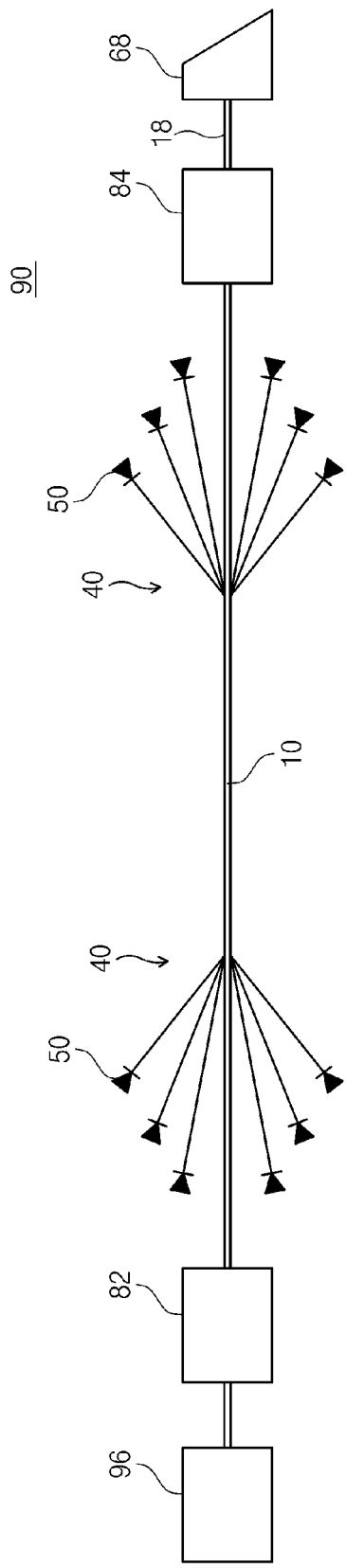

Referring to FIG. 14C, the active optical module 90 of the fourth embodiment of the inventive concept may include a bidirectional pumping mode in which a plurality of mutually facing optical fiber couplers 40 are disposed in the first optical fiber 10 at positions close to the first and second isolators 82 and 84. The first isolator 82 and the second isolator 84 may block laser light propagating in a backward direction. The optical fiber couplers 40 may transmit pump light in opposite directions to the first optical fiber 10 disposed between the first and second isolators 82 and 84. The optical fiber coupler 40 disposed at a position of the first optical fiber 10 close to the first isolator 82 may be oriented in a forward direction, and the optical fiber coupler 40 disposed at a position of the first optical fiber 10 close to the second isolator 84 may be oriented in a backward direction. Therefore, in bidirectional pumping mode, pulse laser light may be amplified by pump light supplied in opposite directions to the first optical fiber 10 disposed between the first and second isolators 82 and 84.

Figure 14D:
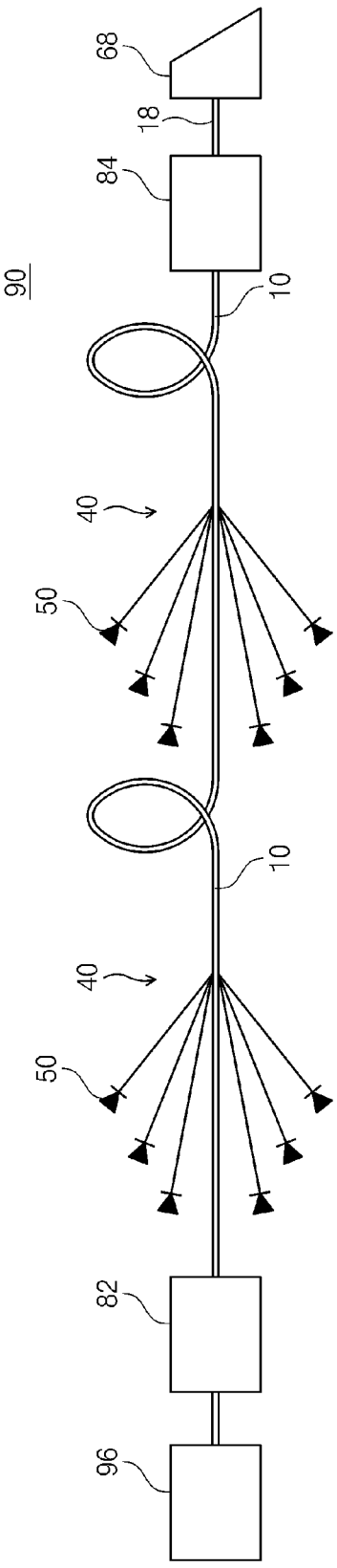

Referring to FIG. 14D, the active optical module 90 of the fourth embodiment of the inventive concept may include a multiple forward pumping mode in which a plurality of optical fiber couplers 40 are disposed in the same direction along the first optical fiber 10 between the first and second isolators 82 and 84. The optical fiber couplers 40 may transmit pump light in a direction from the first isolator 82 to the second isolator 84. The optical fiber couplers 40 may be disposed between the first isolator 82 and the second isolator 84. If pump light supplied from a first optical fiber coupler 40 is exhausted, pump light may be supplied from a second optical fiber coupler 40, so that laser light may be sequentially amplified. The intensity of pump light supplied through the second optical fiber coupler 40 may be greater than the intensity of light supplied through the first optical fiber coupler 40.

As described above, according to the inventive concept, the second optical fibers having the same numerical aperture as that of the first cladding may be coupled to the coupling facet formed by etching the first cladding. In addition, the first cladding and the second optical fibers may have the same refractive index. Therefore, the optical fiber couplers of the above-described embodiments may have improved or optimized optical efficiency and coupling efficiency.

The above-disclosed subject matter is to be considered illustrative, and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. An optical fiber coupler comprising:
a first optical fiber comprising a first core and a first cladding surrounding the first core; and
second optical fibers coupled to the first cladding,
wherein the first cladding comprises a first coupling facet to which ends of the second optical fibers are coupled,
wherein the first optical fiber further comprises a second cladding surrounding the first cladding,
wherein the first cladding comprises:
a first part having a first outer diameter equal to an inner diameter of the second cladding; and
a second part having a second outer diameter smaller than the first outer diameter,
wherein the first coupling facet is defined by a side wall between the first part and the second part.

2. The optical fiber coupler of claim 1, wherein the second optical fibers have a diameter equal to the second outer diameter of the first cladding.

3. The optical fiber coupler of claim 2, wherein the second optical fibers surround the second part of the first cladding in one layer or double layers.

4. The optical fiber coupler of claim 1, wherein the first coupling facet has a direction vertical to the first core.

5. The optical fiber coupler of claim 4, wherein the first coupling facet has a width equal to or greater than a diameter of the second optical fibers.

6. The optical fiber coupler of claim 5, wherein a numerical aperture of the first cladding at the first coupling facet is equal to or greater than a numerical aperture of the second optical fibers.

7. The optical fiber coupler of claim 1, wherein the first cladding further comprises:
a tapered region extending from the second part and having a gradually increasing outer diameter; and
a second coupling facet disposed on a side of the tapered region opposite to the first coupling facet.

8. The optical fiber coupler of claim 7, further comprising third optical fibers coupled to the second coupling facet.

9. The optical fiber coupler of claim 8, wherein the third optical fibers comprise a hard clad silica fiber or a double cladding optical fiber.

10. The optical fiber coupler of claim 1, wherein the first cladding further comprises an up-tapered region increasing in size from the first outer diameter to a third outer diameter greater than the first outer diameter.

11. The optical fiber coupler of claim 10, wherein the second optical fibers have a diameter equal to the first outer diameter of the first cladding.

* * * * *